(12) United States Patent
Prater et al.

(10) Patent No.: US 11,480,518 B2
(45) Date of Patent: Oct. 25, 2022

(54) ASYMMETRIC INTERFEROMETRIC OPTICAL PHOTOTHERMAL INFRARED SPECTROSCOPY

(71) Applicant: Photothermal Spectroscopy Corp., Santa Barbara, CA (US)

(72) Inventors: Craig Prater, Santa Barbara, CA (US); David Grigg, Santa Barbara, CA (US); Derek Decker, Carmel, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 250 days.

(21) Appl. No.: 16/702,094

(22) Filed: Dec. 3, 2019

(65) Prior Publication Data

US 2021/0164894 A1 Jun. 3, 2021

(51) Int. Cl.
*G01J 3/45* (2006.01)
*G01N 21/35* (2014.01)
*G02B 21/00* (2006.01)

(52) U.S. Cl.
CPC ............... *G01N 21/35* (2013.01); *G01J 3/45* (2013.01); *G02B 21/002* (2013.01)

(58) Field of Classification Search
CPC ......... G01J 3/45; G01N 21/35; G01N 21/171; G02B 21/002
See application file for complete search history.

(56) References Cited

U.S. PATENT DOCUMENTS

| | | | |
|---|---|---|---|
| 2,940,355 A | 6/1960 | Cary | |
| 5,574,562 A | 11/1996 | Fishman et al. | |
| 6,532,070 B1 | 3/2003 | Hovinen Minna et al. | |
| 6,687,051 B1 * | 2/2004 | Wang | G02B 23/12 |
| | | | 359/361 |
| 7,630,081 B2 | 12/2009 | Ressler et al. | |
| 7,855,780 B1 | 12/2010 | Djeu | |
| 8,001,830 B2 | 8/2011 | Dazzi et al. | |
| 8,242,448 B2 | 8/2012 | Prater et al. | |
| 8,402,819 B2 | 3/2013 | Dazzi et al. | |
| 8,607,622 B2 | 12/2013 | Dazzi et al. | |
| 8,646,319 B2 | 2/2014 | Prater et al. | |
| 8,680,457 B2 | 3/2014 | Maxik et al. | |
| 8,793,811 B1 | 7/2014 | Prater et al. | |
| 8,869,602 B2 | 10/2014 | Belkin et al. | |
| 9,046,492 B1 | 6/2015 | Prater | |
| 9,091,594 B2 | 7/2015 | Furstenberg et al. | |

(Continued)

FOREIGN PATENT DOCUMENTS

CN   105699358 A   6/2016
DE   102014108424 B3   6/2015

(Continued)

OTHER PUBLICATIONS

Article "Helium-Neon Laser," University of New Mexico, retrieved from http:www.phys.unm.edu/msbahae/Optics%20Lab/HeNe%20Laser.pdf, Nov. 22, 2012, 6 pages.

(Continued)

*Primary Examiner* — Abdullahi Nur

(74) *Attorney, Agent, or Firm* — Patterson Thuente IP

(57) ABSTRACT

Asymmetric interferometry is used with various embodiments of Optical Photothermal Infrared (OPTIR) systems to enhance the signal strength indicating the photothermal effect on a sample.

56 Claims, 16 Drawing Sheets

(56) References Cited

U.S. PATENT DOCUMENTS

| | | |
|---|---|---|
| 9,134,341 B2 | 9/2015 | Prater et al. |
| 9,250,061 B2 | 2/2016 | Lorbeer et al. |
| 9,372,154 B2 | 6/2016 | Prater |
| 9,658,247 B2 | 5/2017 | Yang et al. |
| 9,841,324 B2 | 12/2017 | Furstenberg et al. |
| 10,228,388 B2 | 3/2019 | Prater et al. |
| 10,228,389 B2 | 3/2019 | Yang et al. |
| 10,241,131 B2 | 3/2019 | Prater |
| 10,473,693 B2 | 11/2019 | Yang et al. |
| 10,677,722 B2 | 6/2020 | Li et al. |
| 10,696,405 B2 | 6/2020 | Dowty et al. |
| 10,845,248 B1 | 11/2020 | Cheng et al. |
| 10,942,116 B2 | 3/2021 | Prater et al. |
| 10,969,405 B2 | 4/2021 | Shetty et al. |
| 2002/0105641 A1 | 8/2002 | Anderson |
| 2004/0085540 A1 | 5/2004 | Lapotko et al. |
| 2004/0188602 A1 | 9/2004 | Chinn et al. |
| 2005/0105099 A1 | 5/2005 | Shpantzer et al. |
| 2008/0304046 A1 | 12/2008 | Lee et al. |
| 2009/0161092 A1 | 6/2009 | Zanni et al. |
| 2009/0236528 A1 | 9/2009 | Shpantzer et al. |
| 2009/0249521 A1 | 10/2009 | Dazzi et al. |
| 2010/0044570 A1 | 2/2010 | McGill et al. |
| 2010/0079842 A1 | 4/2010 | Dunleavy et al. |
| 2010/0315646 A1 | 12/2010 | Chism, II |
| 2010/0320171 A1 | 12/2010 | Mao et al. |
| 2011/0122488 A1 | 5/2011 | Truong et al. |
| 2011/0248166 A1 | 10/2011 | Diem et al. |
| 2012/0002030 A1 | 1/2012 | Kalkbrenner et al. |
| 2012/0026485 A1 | 2/2012 | Couston et al. |
| 2012/0122084 A1 | 5/2012 | Wagner et al. |
| 2012/0167261 A1 | 6/2012 | Belkin et al. |
| 2012/0314206 A1 | 12/2012 | Spizig et al. |
| 2013/0134310 A1 | 5/2013 | Furstenberg et al. |
| 2013/0162994 A1 | 6/2013 | Xie et al. |
| 2014/0009808 A1 | 1/2014 | Wang et al. |
| 2014/0289912 A1 | 9/2014 | Andreev |
| 2014/0361150 A1 | 12/2014 | Cheng et al. |
| 2015/0085098 A1 | 3/2015 | Dowaki et al. |
| 2015/0219684 A1 | 8/2015 | Humphris et al. |
| 2015/0285836 A1 | 10/2015 | Humphris et al. |
| 2015/0308947 A1 | 10/2015 | Xu et al. |
| 2016/0011049 A1 | 1/2016 | Furstenberg et al. |
| 2016/0161245 A1 | 6/2016 | Fu et al. |
| 2017/0127983 A1 | 5/2017 | Spegazzini et al. |
| 2017/0146455 A1 | 5/2017 | Mantele et al. |
| 2018/0007343 A1 | 1/2018 | Send et al. |
| 2018/0052186 A1 | 2/2018 | Su et al. |
| 2018/0088041 A1 | 3/2018 | Zhang et al. |
| 2018/0156674 A1 | 6/2018 | Fleming et al. |
| 2018/0180642 A1 | 6/2018 | Shetty et al. |
| 2018/0246032 A1 | 8/2018 | Li et al. |
| 2018/0259553 A1 | 9/2018 | Yang et al. |
| 2018/0364158 A1 | 12/2018 | Wang et al. |
| 2019/0120753 A1 | 4/2019 | Prater et al. |
| 2019/0204230 A1 | 7/2019 | Ota |
| 2019/0317012 A1 | 10/2019 | Furstenberg et al. |
| 2020/0025677 A1 | 1/2020 | Prater et al. |
| 2020/0217643 A1 | 7/2020 | Schnell et al. |
| 2020/0378829 A1 | 12/2020 | Decker |
| 2021/0003504 A1 | 1/2021 | Li et al. |

FOREIGN PATENT DOCUMENTS

| | | |
|---|---|---|
| WO | WO-2013078471 A1 | 5/2013 |
| WO | WO-2018102467 A1 | 6/2018 |

OTHER PUBLICATIONS

Article "Photothermal Lens Technique—Theory and Instrumentation," Swofford, 2015, 42 pages.
Bialkowski S E., et al., "Ultrasensitive Photothermal Deflection Spectrometry Using an Analyzer Etalon," American Chemical Society, 1988, 6 pages.
Bialkowski S E., "Pulsed-Laser Excited Differential Photothermal Deflection Spectroscopy," 1992, 11 pages.
Bialkowski S.E., "Application of the BaTi03 Beam-Fanning Optical Limiter as an Adaptive Spatial Filter for Signal Enhancement in Pulsed Infrared Laser-Excited Photothermal Spectroscopy," Optics Letters, Sep. 15, 1989, 3 pages.
Boyer D., et al., "Photothermal Imaging of Nanometer-Sized Metal Particles Among Scatters," Aug. 2002, vol. 297, Downloaded from www.sciencemag.org on Feb. 9, 2009, 4 pages.
Brandstetter M., et al., "High Power Terahertz Quantum Cascade Lasers with Symmetric Wafer Bonded Active Regions," Applied Physics Letters 103, 171113 2013, 6 pages.
Burghoff D., et al., "Terahertz Laser Frequency Combs," Nature Photonics, vol. 8, Jun. 2014, 10 pages.
Callaway E., "It Opens up a Whole New Universe: Revolutionary Microscopy Technique Sees Individual Atoms for First Time," Nature, vol. 582, Jun. 11, 2020, 2 pages.
Cariou J M., et al., "Refractive-Index Variations with Temperature of PMMA and polycarbonate," Applied Optics, 1986, vol. 25 (3), 3 pages.
Cho P.S., et al., "Investigation of Standoff Explosives Detection via Photothermal/Photoacoustic Interferometry," Chemical, Biological, Radiological, Nuclear and Explosives (CBRNE) Sensing XII, vol. 8018, No. 1, May 13, 2011, 15 pages.
Dowrey A.E., et al., "Industrial Applications of Near-IR Imaging," In Spectrochemical Analysis Using Infrared Multichannel Detectors, Chapter 8, Blackwell Publishing, 2005, pp. 175-188.
Fournier D. et al., "Tomographic Approach for Photothermal Imaging Using the Mirage Effect," Journal of Physique Colloques, 1983, pp. C6-479-C6-482.
Furstenber R., et al., "Chemical Imaging Using Infrared Photo-Thermal Microspectroscopy," U.S. Naval Research Laboratory, 2012, 10 pages.
Gaiduk A. et al., "Supporting Online Material for Room-Temperature Detection of a Single Molecule's Absorption by Photothermal Contrast," Science, Oct. 15, 2010, vol. 330, 14 pages.
Gorgulu K., et al., "All-Silicon Ultra-Broadband Infrared Light Absorbers," Scientific Reports, Dec. 7, 2016, pp. 1-7.
Grodecki K., et al., "Optical Absorption and Raman Scattering Studies of Few-Layer Epitaxial Graphene Grown on 4H-SiC Substrates," Nov. 2009, pp. 835-837.
Harada M., et al., "Photothermal Microscopy with Excitation and Probe Beams Coaxial Under the Microscope and Its Application to Microparticle Analysis," 1993, pp. 2938-2940.
Harthcock M A., et al., "Applications of Transmittance and Reflectance Micro/FT-IR to Polymeric Materials," 1986, vol. 40, Issue 2, pp. 210-214.
Harthcock M A., et al., "Imaging with Functional Group Maps Using Infrared Microspectroscopy," 1988, vol. 42, Issue 3, pp. 449-455.
Hemming A., et al., "A High Power Mid-IR ZGP Ring OPO," with over 30 W of optical power, 2013, 2 pages.
Inoue T., et al., "Realization of Dynamic Thermal Emission Control," Jul. 27, 2014, pp. 928-931.
Jiang N., et al., "Narrow-Linewidth Megahertz-Repetition-Rate Optical Parametric Oscillator for High-Speed Flow and Combustion Diagnostics," Applied Optics, vol. 47, No. 1, Jan. 2008, pp. 64-71.
Jiang P., et al., "Compact High Power Mid-Infrared Optical Parametric Oscillator Pumped by a Gain-Switched Fiber Laser with 'Figure-of-h' Pulse Shape," Optical Society of America, vol. 23, No. 3, Jan. 2015, 6 pages.
Jung J.Y., et al., "Infrared Broadband Metasurface Absorber for Reducing the Thermal Mass of a Microbolometer," Scientific Reports, Mar. 2017, pp. 1-8.
Kluk D., et al., "A High-Bandwidth, High-Precision, Two-Axis Steering Mirror with moving Iron Actuator," 2010, pp. 552-557.
Lasne D., et al., "Label-Free Optical Imaging of Mitochondria in Live Cells," Optical Society of America, 2007, 10 pages.
Li C., et al., "Mid-Infrared Photothermal Imaging of Active Pharmaceutical Ingredients at Submicrometer Spatial Resolution," Anal. Chem., 89, 2017, 4863-4867.

(56) References Cited

OTHER PUBLICATIONS

Li Z., et al., "Super-Resolution Far-Field Infrared Imaging by Photothermal Heterodyne Imaging," The Journal of Physical Chemistry B, 2017, pp. 8838-8846.

Li Z., et al., "Super-Resolution Imaging with Mid-IR Photothermal Microscopy on the Single Particle Level," Physical Chemistry of Interfaces and Nanomaterials, Proceedings of SPIE, Aug. 20, 2015, vol. 9549, 954912-1 to 954912-8, 8 pages.

Li Z., et al., "Super-Resolution Mid-Infrared Imaging Using Photothermal Microscopy," Conference on Lasers and Electro-Optics, Optical Society of America, San Jose, California, 2016, p. ATu3J7.pdf, 2 pages.

Liu M., "Differential Interference Contrast-Photothermal Microscopy in Nanospace: Impacts of Systematic Parameters," Mar. 2017, 9 Pages.

Marcott C., et al., "Mining the Information Content Buried in Infrared and Near-Infrared Band Shapes by Temporal, Spatial, and Other Perturbations," Applied Spectroscopy, vol. 63, No. 12, 2009, pp. 346A-354A.

Mertiri A., et al., "Label Free Mid-IR Photothermal Imaging of Bird Brain With Quantum Cascade Laser," Optical Society of America, 2014, 2 pages.

Mertiri A et al., "Mid-Infrared Photothermal Heterodyne Spectroscopy in a Liquid Crystal Using a Quantum Cascade Laser," Applied Physics Letters, vol. 101, 2012, pp. 1-4.

Mertiri A., et al., "Nonlinear Midinfrared Photothermal Spectroscopy Using Zharov Splitting and Quantum Cascade Lasers," ACS Photonics, American Chemical Society, vol. 1, 2014, pp. 696-702.

Moscatelli A., "Tiny Lenses for Miniature Devices," Dec. 2019, 1 page.

Nedosekin D.A., et al., "Photothermal Confocal Spectromicroscopy of Multiple Cellular Chromophores and Fluorophores," Biophysical Journal, Feb. 1, 2012, 10 pages.

Optotronics, "532nm Green Laser Systems," https://www.optotronics.com/532nm-green-laser-systems.php, 2017, 2 pages.

Peng Y F., et al., "High-Power Mid-Infrared Tunable Optical Parametric Oscillator Based on 3-mm-Thick PPMgCLN," 2012, pp. 87-90.

Sander M.Y., "Mid-Infrared Photothermal Imaging," Laser Science, Optical Society of America, 2015, p. LM1I2.pdf, 1 page.

Selmke M., et al., "Photothermal Single Particle Microscopy: Detection of a Nanolens," ACS Nano, Retrieved from https://arxiv.org/abs/1105.3815v1, 2012, 11 pages.

Stolyarov A.M., et al., "Photothermal Speckle Modulation for Noncontact Materials Characterization," Opt. Lett., 40, 24, Dec. 15, 2015, pp. 5786-5789.

Sullenberger R.M., et al., "Spatially-Resolved Individual Particle Spectroscopy Using Photothermal Modulation of Mie Scattering," Optical Society of America, vol. 42, No. 2, Jan. 15, 2017, pp. 203-206.

Tapos F.M., et al., "High Bandwidth Fast Steering Mirror," Optomechanics, Proceedings of SPIE, vol. 5877, 2005, 14 pages.

Totachawattana A., et al. "Optimization of Mid-IR Photothermal Imaging for Tissue Analysis," Visual Communications and Image Processing, Aug. 26, 2015, 7pages.

Wang et al., "High-Power Terahertz Quantum Cascade Lasers with ~0.23 W in Continuous Wave Mode," AIP Advances, 2016, 6 pages.

Webpage—Optotronics—https://www.optotronics.com/532nm-green-laser-systems.php, 2017, 2 pages.

Winefordner J.D., et al., "Comparison of Calculated Detection Limits in Molecular Absorption, Molecular Luminescence, Raman, Molecular Ionization, and Photothermal Spectrometry," Applied Spectroscopy, vol. 39, No. 3, May 1985, pp. 377-391.

Zanuto V S., et al., "Analysis of the Thermo-Reflectivity Coefficient Influence Using Photothermal Pump-Probe Techniques," 2016, 7 pages.

Zhang D., et al., "Depth-Resolved Mid-Infrared Photothermal Imaging of Living Cells and Organisms with Submicrometer Spatial Resolution," Science Advances, Sep. 28, 2016, 8 pages.

Zhao X., et al., "Heterogeneous and Cross-Distributed Metal Structure Hybridized withMos2 as High-Performance Flexible SERS Substrate," Sep. 2018, 13 pages.

Application and File History for U.S. Appl. No. 15/715,534, filed Sep. 26, 2017, Inventors: Zhang et al.

Application and File History for U.S. Appl. No. 15/826,147, filed Nov. 29, 2017, inventors Shetty, et al.

Application and File History for U.S. Appl. No. 16/877,152, filed May 18, 2020, inventors Li, et al.

Application and file history for U.S. Appl. No. 16/427,866, filed May 31, 2019. Inventors: Decker et al.

Application and file history for U.S. Appl. No. 16/465,824, filed May 31, 2019. Inventors: Prater et al.

* cited by examiner

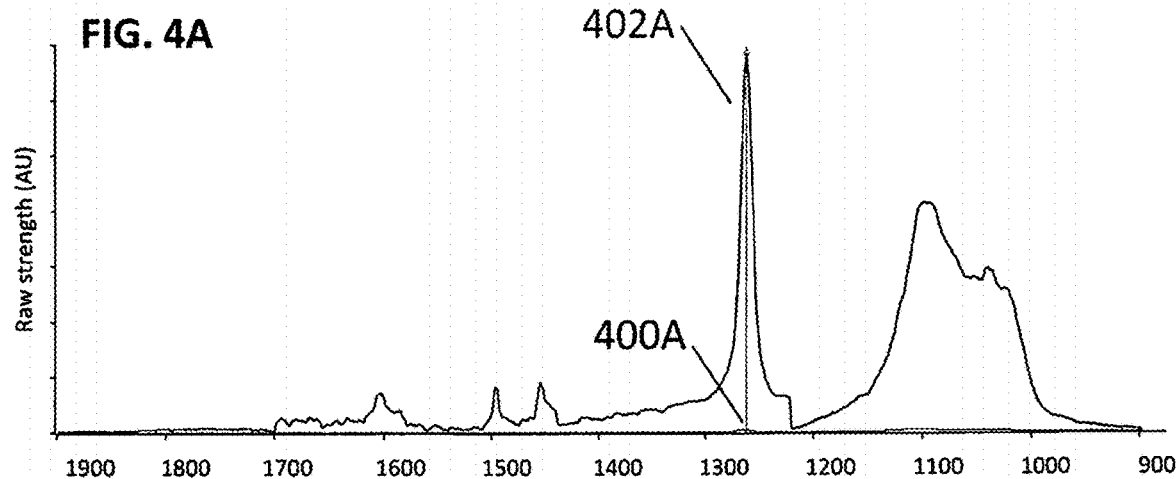
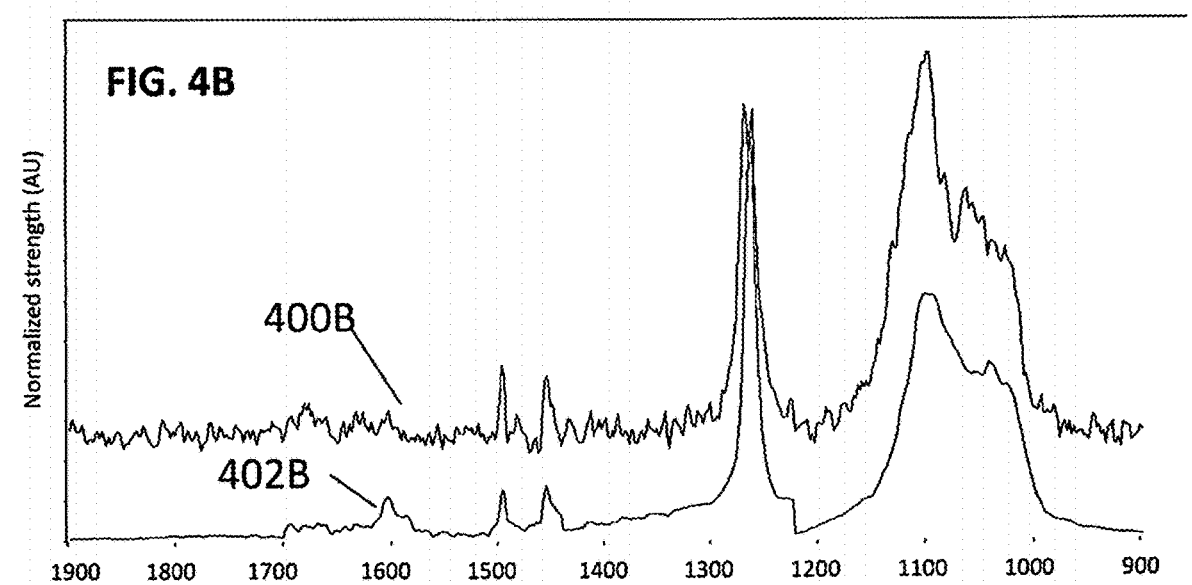

$\theta = \text{ATAN2}(\Delta Y, \Delta X)$

ASYMMETRIC INTERFEROMETRIC OPTICAL PHOTOTHERMAL INFRARED SPECTROSCOPY

TECHNICAL FIELD

This disclosure relates to investigating or analyzing materials by the use of optical means, i.e. using infra-red, visible or ultra-violet light. In particular, this disclosure is related to infrared spectroscopy and imaging with spatial resolution down to the sub-micron scale using an optical photothermal detection technique.

BACKGROUND

Optical photothermal techniques have been described in U.S. Pat. Nos. 9,091,594 and 9,841,324, for example. These references often refer to the technique by different names and acronyms. For the purposes of this application, these techniques collectively will be referred to as Optical Photothermal Infrared (OPTIR).

Several research groups have worked in this general field of OPTIR, including researchers at Naval Research Laboratory, Purdue University, Notre Dame University, Boston University, and the Massachusetts Institute of Technology. Instruments developed in these labs use visible light beams to probe the photothermal response of samples in response to absorption of infrared radiation. Potentially relevant background publications and patents include: (1) R. Furstenberg, C. A. Kendziora, M. R. Papantonakis, V. Nguyen and R. A. McGill, "Chemical Imaging using Infrared Photo-thermal Microspectroscopy" Proc. of SPIE Vol. 8374, 837411 (2012); (2) R. Furstenberg, C. Kendziora, N. D. Bassim, R. A. McGill, and V. K. Nguyen, U.S. Pat. No. 9,091,594 B2 (2015); (3) C. Li, D. Zhang, M. N. Slipchenko, and J.-X. Cheng, Anal. Chem., 89, 9, 4863-4867 (2017); (4) D. Zhang, C. Li, C. Zhang, M. N. Slipchenko, G. Eakins, and J.-X. Cheng, Science Advances, 2, 9, e1600521 (2016). (5) Z. Li, K. Aleshire, M. Kuno, and G. V. Hartland, The Journal of Physical Chemistry B, 121, 37, 8838-8846 (2017); (6) Z. Li, M. Kuno, and G. Hartland, "Super-resolution imaging with mid-IR photothermal microscopy on the single particle level", in SPIE Nanoscience+ Engineering (International Society for Optics and Photonics, 2015), p. 954912-954912-954918; (7) Z. Li, M. Kuno, and G. Hartland, "Super-resolution Mid-infrared Imaging using Photothermal Microscopy", in Conference on Lasers and Electro-Optics (Optical Society of America, San Jose, Calif., 2016), p. ATu3J.7.; (8) A. Mërtiri, A. Totachawattana, H. Liu, M. K. Hong, T. Gardner, M. Y. Sander, and S. Erramilli, "Label free mid-IR photothermal imaging of bird brain with quantum cascade laser", in CLEO: Applications and Technology (Optical Society of America, 2014), p. AF1B. 4; (9) M. Y. Sander, "Mid-infrared photothermal imaging", in Laser Science (Optical Society of America, 2015), p. LM1I. 2; (9) U.S. Pat. No. 9,091,594 B2, entitled "Chemical mapping using thermal microscopy at the micro and nano scales," assigned to the U.S. Secretary of Navy.

There are also devices that have been constructed using off axis illumination and camera sensors to detect photothermal modulation of laser speckle, as discussed, for example, in A. M. Stolyarov, R. M. Sullenberger, D. R. Crompton, T. H. Jeys, B. G. Saar, and W. D. Herzog, Opt. Lett., 40, 24, 5786-5789 (2015), as well as variations in light scattering, as discussed, for example, in R. M. Sullenberger, S. M. Redmond, D. Crompton, A. M. Stolyarov, and W. D. Herzog, Opt. Lett., 42, 2, 203-206 (2017). These approaches, however, are not suitable for microscopy applications for sub-micron dimensions because of focal length/numerical aperture limitations placed on sample imaging optics.

A key limitation in the prior art of photothermal imaging and spectroscopy is that the photothermal effect due to IR absorption can be quite small. For example, the total intensity modulation in collected probe light due to absorption of IR radiation by the sample can be three to six orders of magnitude less than the average intensity of the total collected probe light. Because of this, it can be a challenge to detect small absorptions of IR radiation, either from weakly absorbing samples, samples with weak photothermal responses, microscopically small amounts of sample material, or combinations of these factors. Increasing the measurement time to accomplish orders of magnitude increases in precision is often not practicable. Measurement precision increases proportional to the square root of the sampling time, however, and so increasing the precision of an OPTIR detector by increasing sampling time is limited as a practical matter. For example, one order of magnitude improvement in precision requires sampling times to be increased by a factor of 100.

SUMMARY

According to embodiments described herein, microscopic analysis of a sample uses asymmetric interferometry techniques to improve characterization of infrared absorption characteristics of the sample.

According to one embodiment, an apparatus for microscopic analysis of a sample improves characterization of infrared absorption of the sample. The apparatus includes a source of infrared radiation configured to illuminate the sample with a beam of infrared radiation and a source of probe radiation configured to emit a beam of probe radiation. The apparatus further includes an asymmetric interferometer including a beam splitter configured to divide the beam of probe radiation onto at least two paths. A first path is directed towards the sample such that the beam of probe radiation on the first path at least partially overlaps the beam of infrared radiation, and a second path is directed towards a reference reflector. A beam combiner is configured to create an interference of probe radiation reflected from the sample along the first path with probe radiation reflected from the reference reflector along the second path, wherein a power of the probe radiation reflected along the second path is greater than a power of the probe radiation reflected along the first path. A detector is configured to detect the interference of probe radiation for use in producing a signal indicative of infrared absorption of the sample.

In embodiments, a phase feedback loop is configured to measure and adjust a relative phase of the probe radiation along the first path versus the second path. The phase feedback loop can include an amplifier, a demodulator, and a processor configured to adjust the length of the second path to maintain constructive interference between the probe radiation reflected from the sample along the second path and the probe radiation reflected from the reference reflector along the first path. The apparatus can further include a quadrature interferometer configured to measure and adjust a relative phase of the probe radiation along the first path versus the second path. In embodiments, the beam splitter and the beam combiner can both comprise a common beam splitting optical component. The beam splitting optical component reflects about 50% of incident light and transmits about 50% of incident light. The detector can include a plurality of detectors with a difference in optical phase between at least two of the detectors for use in reconstructing the signal at any phase.

According to another embodiment, a method for microscopic analysis of a sample to provide improved characterization of infrared absorption of the sample includes illuminating the sample with a beam of infrared radiation to create an infrared illuminated spot on the sample, producing a beam of probe radiation, and dividing the beam of probe radiation at a beam splitter onto at least two paths. The two paths include a first path that is directed towards the sample such that the beam of probe radiation on the first path at least partially overlaps the beam of infrared radiation, and a second path that is directed towards a reference reflector. The method further includes recombining the probe radiation reflected from the sample along the first path and the probe radiation reflected off the reference reflector along the second path to create an interference of probe radiation, wherein a power of the probe radiation reflected along the second path is greater than a power of the probe radiation reflected along the first path, and detecting the interference of probe radiation for use in producing a signal indicative of infrared absorption of the sample.

In embodiments, the method further includes measuring and adjusting a relative phase of the probe radiation along the first path versus the second path. In embodiments, the phase feedback loop comprises an amplifier, a demodulator, and a processor, and wherein the method further comprises actively adjusting a length of the second path to maintain constructive interference between the probe radiation reflected from the sample along the first path and the probe radiation reflected from the reference reflector along the second path. The method can include measuring and adjusting a relative phase of the probe radiation along the first path versus the second path with a quadrature interferometer. Dividing and recombining may both be accomplished with a common beam splitting optical component. The beam splitting optical component reflects about 50% of incident light and transmits about 50% of incident light, in embodiments. Recombining may include using a plurality of detectors with a difference in optical phase between at least two of the plurality of detectors for use in reconstructing the signal at any phase.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 4A and 4B depict raw and normalized spectra, respectively, for samples analyzed with both non-interferometric and interferometric optical systems according to embodiments described herein.

DETAILED DESCRIPTION OF THE DRAWINGS

Figure 1:
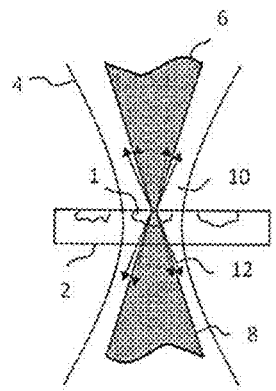
FIG. 1 shows a simplified schematic diagram of the photothermal principle employed by optical photothermal infrared (OPTIR) spectroscopy and imaging.

This specification described methods and apparatuses for performing optical photothermal infrared (OPTIR) imaging and spectroscopy with improved sensitivity, improved signal-to-noise ratio, and decreased background signal.

For purposes of this specification, the following terms are specifically defined as follows:

An "analyzer/controller" refers to a system to facilitate data acquisition and control of the PTP system. The controller may be a single integrated electronic enclosure or may comprise multiple distributed elements. The control elements may provide control for positioning and/or scanning of the probe tip and/or sample. They may also collect data about the probe deflection, motion or other response, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs may be implemented along with discrete circuit components to carry out one or more of the processes described herein.

"Beam combiner" means an optical element that can combine two beams onto the same optical path. In one configuration, a beam combiner may be a beam splitter used in a reverse direction, i.e. combining one beam that reflects off of the beam splitter interface with another beam that is transmitted through the beam splitter interface. A beam splitter cube, for example, can be used as both a beam splitter and a beam combiner. Optical elements that are marketed as beam splitters can be used as a beam combiner, even if they are not used to split light onto two paths. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam combiner can also be an optical fiber based device, for example combining the light from two input fibers into one output fiber, for example a 1×2 fiber coupler. A singler 1×2 fiber coupler can be used as both a beam splitter and a beam combiner.

"Beam splitter" refers to an optical element that can divide light onto at least two paths. A beam splitter can comprise a plate, a cube and/or a prism or other shapes/configurations that can divide a beam of light. The beamsplitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Nomarski or Wollaston prism. A beam splitter may also be non-polarizing, where light is divided between two paths without substantial dependence on the polarization of the incident light. A beam splitter can also be an optical fiber based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another.

A "camera" refers to an array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher.

"Collecting probe light," "Collecting probe radiation" refer to collecting radiation of a probe light beam that has interacted with a sample. The probe light can be collected after reflection, scattering, transmission, evanescent wave coupling, and/or transmission through an aperture probe.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/radiation incident on the detector surface. The signal will generally be an electrical signal, for example a voltage, current and/or an electrical charge. The detector may be a photodiode, a photo-transistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two dimensional array of detector elements, including camera based detectors.

"Diffraction limit" of a light beam means the minimum separation of two optical sources that can be distinguished by a detector. The Abbe diffraction limit d for a microscope having a numerical aperture NA and operating at a wavelength $\lambda$ is defined as $d=\lambda/(2 \cdot NA)$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation.

A "demodulator" refers to a device or system that performs demodulation.

A "feedback loop" is a control loop that is intended to maintain a parameter substantially near a target value ("setpoint") through the adjustment of a control element. A "phase feedback loop" is a feedback loop intended to attempt to maintain the optical phase difference of an interferometer at a target phase value. Note that despite the feedback loop, the optical phase difference will generally not remain truly constant or fixed as disturbances in the optical phase difference can occur at speeds that are too fast for the phase feedback loop to compensate. As such there is often an error, especially a transient error between the target phase value and the actual phase.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Fluorescence" refers to the emission of light from a sample at one wavelength due to excitation at another wavelength due to fluorescent excitation and emission processes.

"Illuminate," "Illuminating," and "Illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting elements, focusing elements and any other beam steering or conditioning elements.

"Infrared absorption spectrum" refers to a spectrum that is proportional to the wavelength dependence of the infrared absorption coefficient, absorbance, or similar indication of IR absorption properties of a sample. An example of an infrared absorption spectrum is the absorption measurement produced by a Fourier Transform Infrared spectrometer (FTIR), i.e. an FTIR absorption spectrum. In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. It is noted that a IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, CO2 lasers, microscopic heaters, electrically or chemically generated sparks, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 cm$^{-1}$ or <1 cm$^{-1}$ less, or may be broadband, for example with a spectral width of >10 cm$^{-1}$, >100 cm$^{-1}$ or greater than 500 cm$^{-1}$. Broadband sources can be made narrow band with filters, monochromators and other devices. The infrared source can also be made up of one of discrete emission lines, e.g. tuned to specific absorption bands of target species.

"Interacting" in the context of interacting with a sample means that light illuminating a sample is at least one of scattered, refracted, absorbed, aberrated, diverted, diffracted, transmitted, and reflected by, through and/or from the sample.

"Interference" reference to the interaction of at least two beams of light including the coherent combination of those light beams.

An "interferometer" refers to an optical apparatus that combines light on at least two paths to create interference between at least two beams. In the context of this application, the two paths are sometimes referred to as a "sample arm" where the light interacts with a sample, and a "reference arm" where the light interacts with a reference reflector.

"Asymmetric interferometer" refers to a configuration of an interferometer comprising interference between light on a sample arm and light on a reference arm in which the amount of light on the reference arm is larger than the amount of light on the sample arm. Note that this is different from other uses of this term that may imply a difference in the length of the arms of the interferometer. The asymmetric interferometer described herein may have equal or unequal interferometer arms, but the asymmetric term refers in this case to the difference in optical power between the reference and sample arms.

A "common path interferometer" is an interferometer in which at least the majority of the sample arm and reference arm share a common optical path and only a minority of the optical path is different.

A "quadrature interferometer" refers to an interferometer with at least two optical paths on which interference occurs and at least two detectors to detect interfering radiation on the two optical paths. A quadrature interferometer can be configured to have an optical phase delay of around 90° between the two interfering paths and hence the two detectors. Quadrature interferometers may also have more detectors, for example four detectors.

A "heterodyne interferometer" refers to an optical interferometer in which the optical frequency and/or optical phase is modulated in at least one arm of the interferometer as compared to the other arm. A heterodyne interferometer can include a "phase modulator," an optical element that can modulate the phase and/or frequency of the light passing through it or reflecting off of it. Phase modulators can include acousto-optic modulators, electro-optic modulators, liquid crystal modulators, or other devices that alter the phase/frequency of light in response to an input signal or stimulus.

A "lock-in amplifier" is one example of a "demodulator" (defined above) and is a device, system, and/or an algorithm that demodulates the response of a system at one or more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

A "mass spectrometer" refers to an apparatus for analyzing the molecular mass distribution of an analyte.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high speed rotating mirror devices. Modulation can also be accomplished with devices that provide time varying transmission like acousto-optic modulators, electro-optic modulators, photo-elastic modulators, pockel cells, and the like. Modulation can also be accomplished with diffraction effects, for example by diffractive MEMS-based modulators, or by high speed shutters, attenuators, or other mechanisms that change the intensity, angle, and/or phase of the laser intensity incident on the sample.

"Near infrared light" generally refers to a wavelength range of infrared (IR) light corresponding to 0.75-2 µm.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with illuminating radiation.

A "narrowband light source" a light source with a narrow bandwidth or linewidth, for example a light of linewidth smaller than 8 cm−1, but in general it can be a light source with a linewidth narrow enough that the linewidth does not cover a spectral range of interest of the sample.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

A "probe source," "probe light source," or "probe radiation source" refer to a radiation source that can be used for sensing of an optical property of a sample. A probe light source can be used to sense the response of the sample to the incidence of light from the infrared light source. The radiation source may comprise a gas laser, a laser diode, a superluminescent diode (SLD), a near infrared laser, a UV and/or visible laser beam generated via sum frequency or difference frequency generation, for example. It may also comprise any or other sources of near-infrared, UV, and/or visible light that can be focused to a spot on the scale smaller than 2.5 micrometer, and or even smaller than 1 micrometer, and possibly smaller than 0.5 micrometer. In some embodiments, the probe light source may operate at a wavelength that is outside the tuning or emission range of the infrared light source, but the probe light source can also be a fixed wavelength source at a select wavelength that does in fact overlap with the tuning range of the infrared light source. A "probe light beam" or "sensing light beam" is a beam originally emitted from a probe light source.

"Probe beam" is a beam of light or radiation that is directed onto a sample to detect a photothermal distortion or other optical change resulting from the interaction of IR radiation with the sample, for example to detect the absorption of IR radiation by the sample.

"Raman" refers to light that is inelastically scattered from a sample at one or more wavelengths that are different from the excitation wavelength due to Raman scattering. "Raman spectroscopy" refers to measuring the spectroscopic content (Raman spectra) of Raman scattered light, for example the intensity of Raman scattered light as a function of Raman shift. "Raman spectrometer" is a device for examining Raman shifts in light collected from a sample and producing Raman spectra and/or Raman images.

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

A "retarder" refers to an optical element that induces a relative optical phase delay in an optical path. Examples of retarders are wave plates, for example half wave plates, quarter wave plates and eight wave plates. One or more retarders/wave plates can be used to introduce an optical phase difference between two polarizations of light, for example to introduce a phase difference between two paths of a quadrature interferometer.

"Spectrum" refers to a measurement of one or more properties of a sample as a function of wavelength or equivalently (and more commonly) as a function of wavenumber.

"Vacuum Analytical Techniques" refers to any number of materials characterization techniques commonly or exclusively performed in vacuum, including, but not limited to: scanning electron microscopy (SEM), transmission electron microscopy (TEM), x-ray diffraction (XRD), energy dispersive X-ray spectroscopy (EDS), time of flight mass spectrometry (TOF-SIMS), mass spectrometry (MS), and atomic force microscope-based mass spectrometry (AFM-MS).

The terms "about" or "approximate" and the like are synonymous and are used to indicate that the value modified by the term has an understood range associated with it, where the range can be ±20%, ±15%, ±10%, ±5%, or ±1%.

The term "substantially" is used to indicate that a result (e.g., measurement value) is close to a targeted value, where close can mean, for example, the result is within 80% of the value, within 90% of the value, within 95% of the value, or within 99% of the value.

Optical Photothermal Infrared (OPTIR) Imaging and Spectroscopy

FIG. 1 depicts an OPTIR imaging system. Some systems that are usable in an OPTIR system are described in copending and commonly-owned PCT patent application PCT/US2017/063807 and PCT/US2019/034944, for example, the disclosures of which are incorporated by reference in their entirety. A region 1 of a sample 2 is illuminated with a beam of infrared radiation 4, causing a temperature rise, i.e. a photothermal response, in IR absorbing regions of the sample 2. To measure the photothermal response resulting from the IR absorption, at least a portion of the IR absorbing regions 1 are also illuminated with a beam of probe radiation 6. In the configuration shown, this probe beam 106 is then reflected back along the illuminating path, and/or transmitted (8) through the sample. Both reflected and transmitted portions are indicated with arrows in FIG. 1, in addition to the illustrations of the beam waists showing the focused probe radiation 6. The change in temperature of the IR illuminated sample 2 and/or surroundings (such as the air or fluid above or surrounding the sample) from IR absorption of the sample 2 can cause a change in the phase, polarization, intensity and/or angles of light reflected/scattered (10)

from the sample 2, and/or the phase/polarization/intensity/ angles of the light transmitted (12) through the IR absorbing regions 1. By measuring fluctuations in collected probe light it is possible to create a signal indicative of the absorption of IR light by the absorbing regions 1 of the sample. In the configuration shown, probe light is collected in a reflected configuration, but measurements can similarly be performed in transmission and scattering configurations.

In some systems, the probe beam 6 can comprise a beam of visible and/or ultraviolet light, i.e. a wavelength that is significantly shorter than that of the IR light 4. The reason for the use of UV or visible light is that the shorter wavelengths of UV/visible light allows it to be focused to a much smaller spot than the IR radiation. As such it can be used to measured IR absorption with spatial resolution a factor >10× better than with conventional IR microscopy. In far-field microscopy, optical diffraction limits the spatial resolution achievable to a length scale on the order of the wavelength of light used. Specifically, the minimum detectable separation $\delta$ between two objects using the Rayleigh criterion is given by $\delta=0.61\lambda/(n\ NA)$, where $\lambda$ is the wavelength of infrared light used, n is the index of refraction of the surrounding media, and NA is the effective numerical aperture of the microscope objective used. High power IR objectives usually have a maximum NA in the range from 0.7 to 0.81, setting the best achievable spatial resolution in air under the Rayleigh criterion to around 75% to 87% of the wavelength used. For example, at $\lambda=10$ μm, the spatial resolution $\delta$ is around 8 μm.

The spatial resolution achievable by the OPTIR technique is set by the wavelength of the visible probe beam, not the wavelength of the IR beam. The improvement in spatial resolution achievable with the OPTIR technique is determined by the ratio of the IR wavelength to the probe wavelength. For example, with $\lambda_{IR}=10$ μm and $\lambda$probe=0.532 μm, the spatial resolution improvement for the OPTIR technique can be (10/0.532)~19× better conventional IR microscopy with the same objective. Using $\lambda$probe=0.532 μm and the same NA as above, the OPTIR technique produce spatial resolution of around 0.4 μm. Even higher spatial resolution can be achieved with higher NA objectives, for example an objective optimized for visible light microscopy and/or using shorter wavelength probe beams, for example in the blue/UV range.

In some embodiments, brief periodic pulses of IR illumination (on the order of hundreds of nanoseconds) are used. The use of brief IR pulses in combination with synchronous detection techniques can provide high sensitivity and spatial resolution. The signal indicative of IR absorption can be measured as a function of the wavelength of IR radiation to generate IR absorption spectra and the IR absorption signal can be measured as a function of relative sample position to generate spatially resolved maps of chemical composition of the sample. Spatially resolved maps can be created by measuring IR absorption at select wavelengths (or equivalently wavenumbers) as a function of sample position, and/or entire IR absorption spectra can be measured at multiple locations on a sample. In this case of so-called hyperspectral imaging, the data cube has transverse dimensions x and y along the sample surface while the third dimension comprises IR absorption spectra which is used to identify molecules by their excitation modes (stretching, bending, twisting, etc.).

Optical Photothermal Infrared (OPTIR) microscopy is a relatively new technique that uses an optical microscope to provide measurements of infrared absorption with spatial resolution roughly 10× better than conventional IR microscopes. This is achieved by using a shorter wavelength "probe beam" to measure IR absorption on a much smaller length scale than the IR microscope. The reason for the resolution improvement is that the shorter wavelength light results in a smaller diffraction limit. For example using a probe beam with a wavelength of 532 nm, the equation above gives a diffraction limit of d=0.34 μm, more than 10× better than the IR example above.

The OPTIR technique works by measuring small changes in the probe beam after interacting with IR absorbing regions of the sample. IR absorbing regions of the sample convert absorbed IR radiation into heat, causing a local temperature rise in the sample. This temperature rise can change the shape, size, surface position, and/or index of refraction of the IR absorbing regions of the sample. One or more of these changes can change the intensity, angle, and or optical phase of probe light after interacting with the sample. Light that is reflected from, scattered from and/or transmitted through the sample can be collected and analyzed. Unfortunately, the degree of photothermal modulation of the probe beam is quite small. For example, this temperature change in the IR absorbing regions of the sample typically causes a small fractional change γ in the amount of probe light reflected and/or scattered from and/or transmitted through the sample. This fractional photothermal change γ is typically of order $10^{-4}/°$ C., i.e. the IR absorption of the sample induces only a one part in 10,000 per degree Celsius change in the amount of light returning from the sample. This can make accurate and sensitive detection of IR absorption quite difficult, especially for weakly absorbing samples and/or weak absorption bands. A solution is therefore needed that emphasizes the photothermal response signal in the output generated by the detector. As described herein, novel use of asymmetric optical paths and manipulations of detected signal are used to create usable data regarding the composition of the materials in a sample.

Figure 2:
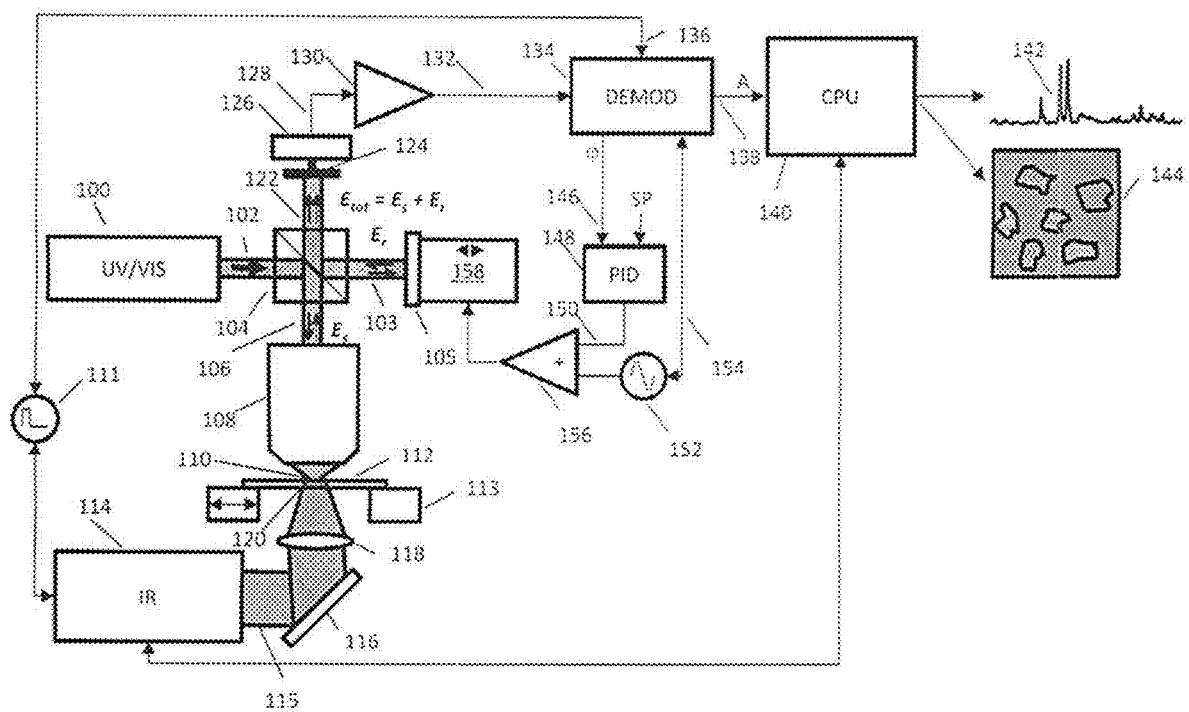
FIG. 2 is a simplified schematic diagram of an embodiment of an asymmetric interferometric OPTIR system.

FIG. 2 illustrates one embodiment of the instrument described herein for performing sub-micron IR spectroscopy with improved sensitivity using an asymmetric interferometer. IR laser 114 produces an IR beam 115 that is used to illuminate a region of sample 112. The IR source 114 may be chopped, pulsed, or otherwise modulated to induce a transient photothermal response in the sample due to absorption of IR radiation. In one embodiment, the IR source is pulsed, for example triggered by a synch signal 111. The synch signal can be generated by dedicated trigger electronics, a microscope controller, a data acquisition and control system, and/or by demodulator 136. Alternately, the IR source 114 itself can generate the trigger synch signal 111 that can be shared with the demodulator 136 to synchronously demodulate the transient photothermal signal. The IR beam 115 may be optionally steered by one or more steering mirrors 116 and focused by focusing optic 118. Steering mirrors 116 may be fixed mirrors, manually adjustable mirrors, electronically controllable mirrors, or any combination thereof. Focusing optic 118 may be a lens, a collection of lenses, or a microscope objective, for example a reflective objective using a Schwarzschild design, or one or more curved mirrors, for example an off-axis parabolic mirror and/or any other collection of optics that produce an illumination spot 120 on a region of sample 112. IR radiation absorbed by IR absorbing regions of the sample generate a photothermal response that are measured with a separate probe beam 110 that will be described below.

The probe beam 102 of FIG. 2 is generated by a UV/VIS source 100. The term "UV/VIS" is used for shorthand to describe a radiation source that may generate light within the ultraviolet and/or visible wavelength range, but more generally should just have a shorter wavelength than that of the IR source 114. Although UV/VIS is used as the shorthand name for this radiation source 100, it could also be a near-IR source, for example with a wavelength of 785 nm or 1064 nm or other similar wavelengths. The UV/VIS source 100 generates a beam of probe radiation ("probe beam") 102 that is directed to a beam splitter 104. Between the source 100 and the beam splitter 102 there may be any number of additional optical components not shown, e.g. for beam steering, beam conditioning, beam expansion, power attenuation, polarization, etc.

The beam splitter 104 divides the probe beam 102 into two paths, with one beam 106 directed towards the sample on the "sample arm" of the interferometer and another beam 103 director towards a reference reflector 105 on the "reference arm" of the interferometer. Probe radiation beam 106 on the sample arm is directed through an objective 108 that focuses the Probe radiation beam to a spot 110 that at least partially overlaps the IR spot 120. When IR absorbing regions of the sample absorb IR light, they heat up causing a change in at least one of the sample size, surface position, surface curvature, index of refraction, sample reflectivity and/or sample transmission. As described above, this temperature change in the IR absorbing regions of the sample causes a small fractional change $\gamma$ in the amount of Probe radiation reflected and/or scattered from and/or transmitted through the sample. Probe radiation is recollected after interacting with the sample, for example by the same objective 108 used to illuminate the sample with probe radiation. The collected probe radiation can be then directed on a path similar to the path of incoming beam 106 but in the direction of the arrow next to the label $E_s$. The label $E_s$ refers to the electric field of the light returning from the sample and this will be discussed below in association with the detection amplification achieved with the asymmetric interferometer.

In one embodiment, beam splitter 104 has a reflectance of about 50%. Accordingly, beam splitter 104 sends roughly equivalent amounts of light along both the first path 106 and the second path 103. (A 50/50 beam splitter is advantageous in the configuration shown in FIG. 2 where light will pass through beam splitter 104 twice. Other beam splitter fractions may also be used, especially in alternate interferometer configurations for example a Mach-Zehnder interferometer where a separate beam splitter is used to recombine the interferometer beams, i.e. such that the light only passes through beam splitter 104 once.) Reference reflector 105 is a mirror or other reflector that returns light routed along the second path 103. In some embodiments, >90% of the light incident on reference reflector 105 is reflected back on path 103. A focusing element (not shown) can optionally be used in the reference arm path 103 in advance of the reference reflector, for example to balance any optical dispersion introduced by objective 108, for example in a Linnik configuration, e.g. having an additional objective in the reference arm that is matched to objective 108. In other embodiments, an optional attenuator (not shown) can be placed on light path 103 to return less light on the reference path from the reference reflector 105. The returning light from reference reflector 105 is labeled $E_r$, which refers to the electric field of the light returning from the reference reflector 105.

At least a portion of the UV/VIS beam returning from the sample, as well as a portion of the UV/VIS beam returning from reference reflector 105, is then transmitted through the beam splitter 104 along path 122 towards detector 126 which is optionally masked by an aperture, iris, pinhole 124 (or similar) to select a portion of the return UV/vis beam for measurement. The path 122, referred to herein as the detector arm, therefore has a resulting combined beam with components of both light from the reference arm and the sample arm to create a combined electric field indicated by $E_{tot}=E_r+E_s$.

As described above, the interferometer has been intentionally arranged such that the interferometer is asymmetric in that the magnitude of $E_r$ will be much larger than $E_s$. This occurs because the reflectance of a sample will typically be much lower than the high reflectance of the reference reflector 105. This asymmetric configuration is different from a balanced interferometer where one would attempt to roughly balance the amount of light in the reference arm and sample arm. In various embodiments, the asymmetric inteferometric combination of $E_r$ and $E_s$ results in an amplification of up to 500× in the detected intensity of the photothermal modulation component $\gamma$. This interferometric amplification will be described in detail in following sections, in particular with respect to FIG. 3. Interfering light from the sample and reference arms that impinges onto at least one detector 126 that generates a UV/VIS detector signal 128. Detector signal 128 that is optionally amplified and/or filtered by signal conditioning electronics 130 resulting in conditioned UV/VIS signal 132. In the case of multiple detectors 126, signal conditioning electronics 130 can produce composite signals that reflect a combination of signals on multiple detector elements, for example a difference, sum, ratio or other mathematical combination of individual detector signals. The conditioned UV/VIS signal(s) is/are directed to optional demodulator 134 for synchronous/phase sensitive detection of a modulation of the UV/VIS signal in response to IR absorption by the sample. The demodulator 134 can produce one or more signals 138 (labeled "A") that are indicative of the IR absorption by the UV/VIS illuminated region of the sample. These signals indicative of IR absorption can then be transported to a CPU 140 for any further processing, analysis, and/or display.

In particular, the CPU 140 may be used to calculated and display IR spectra 142 and IR images 144. IR spectra 142 are created by measuring the signal indicative of IR absorption 138 at a plurality of wavelengths of the IR source 114. IR images 144 can be created by measuring the signal indicative of IR absorption 138 as a function of sample position, e.g. by raster scanning the sample 110 on a translation stage 113. In alternative embodiments, it is possible to create such images by moving the sample 110, the UV/VIS laser beam 110 (with beam steering optics not shown) or any combination/thereof. The IR beam can also be moved, for example with beam steering mirror 116. Hyperspectral arrays can be created by measuring a plurality of IR spectra 142 at a plurality of locations of the sample 110. Sparse sampling techniques can also be applied, e.g. sampling at only a portion of IR wavelengths and/or at a portion of sample locations. Reconstruction techniques, for example convolutional neural networks, compressed sensing, or other similar techniques can be used to reconstruct a largely accurate representation of a full hyperspectral array with only a small portion of sampled wavelengths/positions.

Origin of the Interferometric Amplification

Figure 3:
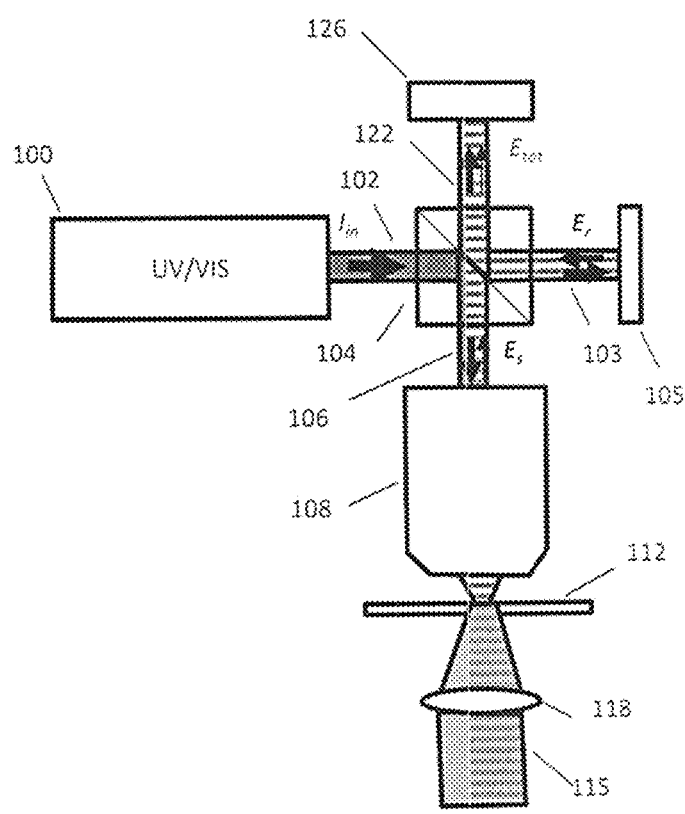
FIG. 3 is a detailed view of a portion of the asymmetric interferometer of FIG. 2.

FIG. 3 illustrates the signal amplification that can be achieved using the current device, which takes advantage of an asymmetric interferometer. FIG. 3 is a close-up view of a portion of the asymmetric interferometer of FIG. 2, with text associated with the same numerical callouts for FIG. 2 applying to FIG. 3 as appropriate. FIG. 3 has been simplified to just show the essential elements of the asymmetric interferometer and the accompanying disclosure herein focuses on the signal level at the detector 126 resultant from these elements. In particular, the signal at the detector 126 results from the interferometric combination of the electric fields from the sample arm (path 106) and the reference arm (path 103) as they combine on the path 122 to the detector 126. The intensity I at the detector 126 is given by the square of the magnitude of the total electric field $E_{tot}$ at the detector, as indicated in Eq. 1 below $$I \sim |E_{tot}|^2 = |E_r + E_s|^2 = E_r^2 + 2E_r E_s \cos \varphi + E_s^2 \qquad \text{Eq. 1:}$$

where (as described with respect to FIG. 2) $E_r$ is the electric field contribution from the reference arm, $E_s$ is the electric field contribution from the sample arm and $\varphi$ is the optical phase between the sample and reference arm. Without interferometric amplification, i.e. with $E_r = 0$, the intensity at the detector is simply $E_s^2$.

In one interferometric embodiment, the apparatus is configured such that $E_r \gg E_s$ providing an arrangement that uses the contribution from the reference arm to dramatically amplify the detection of the photothermal signal. The reason for this amplification is that in the case that $E_r \gg E_s$, the cross-term $2E_r E_s \cos \varphi$ provides inteferometric amplification of the electric field $E_s$ from the sample by the multiplication with the much larger term $E_r$. If for example the optical phase is set such that $\varphi = 0$, and hence $\cos \varphi = 1$, the cross-term $2E_r E_s$ is much larger than $E_s^2$, thus leading to dramatic amplification of the signal. This amplification is illustrated in FIGS. 4A and 4B where use of asymmetric interferometric amplification resulted in a 150× increase in signal level and a 35× increase in signal to noise ratio.

This improvement comes from the fact that the asymmetric interferometer provides an advantageous amplification of the otherwise small photothermal modulation amplitude in the OPTIR technique. Reconsider Eq. 1, but in this case specifically including a small photothermal modulation. Without interferometric amplification, the intensity at the detector would be $$I = E_s^2(1 \pm \gamma \Delta T) \qquad \text{Eq. 2:}$$

where $\gamma$ is the fractional photothermal modulation and $\Delta T$ is the temperature rise in the sample at the location of the probe beam due to IR absorption. (The plus or minus in equation above depends on the details of the detection mechanism.) As mentioned previously, the fractional photothermal change $\gamma$ is typically of order $10^{-4}/°$ C. for many common materials. So without interferometric amplification, the photothermal change in detected intensity $\Delta I$ is very small, given by:

$$\Delta I = E_s^2 \gamma \Delta T. \qquad \text{Eq. 3:}$$

Now consider the detected signal level in the case of interferometric detection. In this case, Eq. 1 is rewritten but with the electric field in the sample arm including the photothermal modulation, i.e.

$$E_s = E_{s0} + \sqrt{\gamma \Delta T} E_{s0} \qquad \text{Eq. 4:}$$

where $E_{s0}$ is the dc level of the electric field from the sample arm and $\gamma$ is the fractional photothermal modulation and $\Delta T$ is the temperature rise. The square root term comes from the fact that $I_s = E_s^2$, thus $E_s = \sqrt{I_s}$.

Plugging Eq. 4 into Eq. 1 yields:

$$I = |E_{tot}|^2 = |E_r + E_s|^2 = E_r^2 + 2E_r(E_{s0} + \sqrt{\gamma \Delta T} E_{s0}) \cos \varphi + (E_{s0} + \sqrt{\gamma \Delta T} E_{s0})^2 \qquad \text{Eq. 5:}$$

which expands to:

$$I = |E_r|^2 + 2E_r(E_{s0} + \sqrt{\gamma \Delta T} E_{s0}) \cos \varphi + E_{s0}^2 + 2\sqrt{\gamma \Delta T} E_{s0}^2 + \gamma \Delta T E_{s0}^2 \qquad \text{Eq. 6:}$$

Using a detection system that is sensitive just to the temperature induced AC modulation of the intensity, for example with a lock-in or a differential detection scheme, the modulation of the photothermal signal $\Delta I$ (i.e., the portion of the intensity I in Eq. 6 that is affected by changes in intensity along the sample arm 106) is given by:

$$\Delta I = 2\sqrt{\gamma \Delta T} E_r E_{s0} \cos \varphi + (2\sqrt{\gamma \Delta T} + \gamma \Delta T) E_{s0}^2 \qquad \text{Eq. 7:}$$

Because $\gamma$ is typically of order $10^{-4}/°$ C. and hence $\gamma \Delta T \ll 1$ for most temperature practical temperature changes, $2\sqrt{\gamma \Delta T} \gg \gamma \Delta T$, the $\gamma \Delta T$ term can be neglected, resulting in the following simplification.

$$\Delta I = 2\sqrt{\gamma \Delta T} E_r E_{s0} \cos \varphi + 2\sqrt{\gamma \Delta T} E_{s0}^2 = 2\sqrt{\gamma \Delta T}(E_r E_{s0} \cos \varphi + E_{s0}^2) \qquad \text{Eq. 8:}$$

In many traditional interferometers, the electric field in the reference arm is chosen to match the E field in the sample arm such that the signal has a maximum modulation with variation in the optical phase $\varphi$. In the case of asymmetric interferometry employed under one embodiment, however, $E_r \gg E_s$ is chosen such that the $E_{s0}^2$ term can be neglected. Using a beam splitter 104 that directs approximately equal amounts of light down both the sample path 106 and the reference path 103, this can be achieved by using a high reflectivity reference reflector 105 with little or no attenuation on the reference path of the interferometer. In this arrangement the light returning from the reference arm will be more intense than the light returning from the sample arm (i.e. $E_r \gg E_s$) because the reflectance of the sample will typically be much lower than the reflectance of the reference mirror 105. The sample arm can also incur additional losses associated with light passing though objective 108. The condition $E_r \gg E_s$ can also be achieved with alternate interferometer arrangements using unbalanced beam splitters, for example 90:10 or 70:30 using alternative beam combining arrangements, for example a Mach-Zehnder interferometer. In any case when $E_r \gg E_s$, Eq. 8 simplifies even further to:

$$\Delta I = 2\sqrt{\gamma \Delta T} E_r E_{s0} \cos \varphi \qquad \text{Eq. 9:}$$

It is instructive then to compare Eq. 9 to Eq. 3, the non-interferometric case. There are two key differences that lead to amplification. First, while the non-interferometric case (Eq. 3) provides an intensity change $\Delta I$ that is proportional to $\gamma \Delta T$, the asymmetric interferometer has an intensity change $\Delta I$ that is proportional to $2\sqrt{\gamma \Delta T}$. As long as the term $\gamma \Delta T$ is less than 1, taking the square root makes it larger. For example if $\gamma = 10^{-4}/°$ C. and $\Delta T = 1°$ C., $\gamma \Delta T = 10^{-4}$ and $2\sqrt{\gamma \Delta T} = 2 \times 10^{-2}$. So, the use of asymmetric interferometry can increase the signal level by two orders of magnitude just through the square root instead of linear dependence on the small photothermal modulation coefficient $\gamma$. For some materials (e.g. inorganics) the photothermal modulation coefficient may be much smaller, $\sim 10^{-6}/°$ C., thus providing even larger benefits. In embodiments, it is desirable that the photothermal effect can be measured with temperature changes $\Delta T$ that are quite small e.g. less than $10°$ C. or even less than $1°$ C. so as not to perturb the sample. In these cases, $\gamma \Delta T$ will typically be far less than 1.

A second advantage is the replacement of the $E_s^2$ term of Eq. 3 with the $E_r E_{s0}$, an effect that provides amplification of the signal level, by the ratio of $E_r$ to $E_s$, a ratio that can be quite large. This is illustrated schematically by the thickness of the arrows associated with the light on the sample and reference paths in FIG. 3. The light on the sample arm 106 can be attenuated by two main factors. First, many samples studied by the OPTIR technique are optically transparent, thus they reflect a small amount of light back to the detector, as indicated by the thinner arrow on the return path. For example, an optically transparent sample with an index of refraction of 1.5 will reflect only about 4% of the incident light back up through the objective. Second, the light in the sample arm has additional losses associated with non-ideal optical throughput of the objective and associated optics. For example, in the case that an objective that focuses the light is an objective with a central obscuration (e.g. a reflective Schwarzschild objective), up to 50% of the light may be blocked.

In some embodiments, it is desirable to attenuate the Probe radiation going to the sample to avoid photo-induced damage to the sample, especially for dark and/or colored samples. All of these effects can result in a decrease in the light returning on the sample arm 122 to the detector. But the light in the reference arm 103 can have much higher intensity than in the sample arm 106 since the light on the reference path need not suffer large reflection losses, e.g. using a highly reflective reference mirror 105 can return ~99% of the light back on the reference path 103. Further, omitting attenuators that would normally be used to match the intensities in the sample and reference arm in a balanced interferometer ensures that a maximal amount of reference light is returned from the sample arm 103 to the detector 126. In practice it can be desirable to have an attenuator in the reference arm to adjust to find the optimal amount of amplification for a given measurement.

The expected improvement from this asymmetric interferometric detection, including the reflectivity and optical throughput effects can be quantified as follows. In the case of no inteferometric detection, the change in detected intensity $dI_n$ can be approximated by:

$$dI_n = (\gamma \Delta r \alpha^2) I_{in} \quad \text{Eq. 10:}$$

where $\gamma$ is the fractional photothermal modulation, $\Delta T$ is the sample temperature rise, r is the sample reflectivity, $\alpha$ is the optical throughput on the sample arm, and $I_{in}$ is the input power of the UV/VIS laser to the system. In contrast, in the case of asymmetric interferometric detection, the change in intensity at the detector $dI_i$ due to photothermal modulation is given by:

$$dI_i = (2\sqrt{\gamma r \Delta T} \alpha B^2) I_{in} \quad \text{Eq. 11:}$$

where B is the beam splitter splitting fraction, i.e. 0.5 for a 50/50 beamsplitter. The improvement in asymmetric interferometric detection versus non-interferometric detection can be seen by taking the ratio $dI_i/dI_n$.

$$\frac{dI_i}{dI_n} = \frac{2B^2}{\alpha \sqrt{\gamma r \Delta T}} \quad \text{Eq. 12}$$

Using B=0.5, $\alpha$=0.5, $\gamma=10^{-4}$/° C., r=0.04, and $\Delta T$=1° C., $dI_i/dI_n$=500, i.e. that asymmetric interferometric detection can provide a 500× improvement in intensity of the measureable photothermal effect over photothermal microscopes that do not incorporate the interferometric systems shown in FIGS. 2 and 3. The reason for the improvement is the same as the discussion associated with Eq. 9 vs. Eq. 3, except that in this example, the contributions of the sample reflectivity, optical throughput losses, and the effects of the interferometric beam splitter are explicitly included. The bottom line is that there is a dramatic improvement in asymmetric interferometric detection, even taking into account the beam splitter losses at 104. In the case that of a smaller fractional photothermal modulation factor $\gamma$, the amplification is even more pronounced. For example with $\gamma=10^{-6}$/° C., $dI_i/dI_n$=5000, a 5000× improvement. The scale of this improvement can be readily measured in an apparatus as described by performing one measurement of the strength of the photothermal signal indicative of the IR absorption of the sample with and without the reference arm path 103 blocked. With the reference arm path 103 blocked, the signal will be proportional to detection without asymmetric interferometric detection, i.e. a signal proportional to Eq. 10. Unblocking the reference arm path 103 results in asymmetric interferometric detection with a signal proportional to Eq. 11. The use of asymmetric interferometric detection can provide an improvement of at least 10× in signal strength and as high as 500× or even 5000× as described above. More modest improvements can still be achieved with a balanced interferometer, i.e. with the power in the reference arm roughly matched to that in the sample arm. For example balanced interferometric detection with a $\Delta T$=1° C. can provide a signal amplification of around 50×, and $\Delta T$=10° C. can provide a signal amplification around 16× vs. non-interferometric detection.

This improvement is illustrated in FIGS. 4A and 4B. FIG. 4A shows two spectra on the same absolute scale. Spectrum 400A is just barely visible above the baseline and was taken without interferometric detection. Spectrum 402A, in contrast, was taken at the same sample location with asymmetric interferometric detection according to the embodiment described above. The raw signal level of the asymmetric interferometric spectrum 402A is roughly 150× stronger than that of spectrum 400A without interferometric detection.

FIG. 4B shows the same spectra normalized to similar scales, 402B being with asymmetric interferometric detection and 400B being without interferometric detection. Spectrum 402B has about 35× improvement in signal to noise versus spectrum 400B.

In a system using asymmetric interferometric detection, the detected modulation intensity $dI_i$ (in Eq. 11) is no longer linearly dependent on the sample temperature rise $\Delta T$, as it is in the non-inteferometric case Eq. 10. In conventional OPTIR, the detected modulation intensity is often linearly proportional to $\Delta T$ which in turn is linearly related to the IR absorption coefficient in many measurement cases. This is advantageous as it allows direct comparison of OPTIR spectra to IR spectra libraries obtained by conventional infrared spectroscopy. In accordance with various embodiments of the current interferometric detection scheme, it's the square root dependent on $\Delta T$ provide the potential to distort the relative peak amplitudes in measured IR absorption spectra relative to conventional IR library spectra. But by squaring the detected signal as a function of wavenumber, the linear dependence on absorption coefficient can be recovered, ensuring appropriate matches to library spectra that are typically used in comparison to detected spectra to make determinations regarding the materials being analyzed.

Interferometer Stabilization

One of the challenges with interference-based detection is that the amplitude of the modulation signal at the detector due to sample IR absorption is highly dependent on the optical phase difference $\varphi$ between the signal and reference paths. For example, a quarter wavelength shift in the relative path lengths changes the interferometer sensitivity to the IR absorption from maximal to zero. This comes from the cos $\varphi$ term in Eq. 9. A shift from a phase of 0° to 90° causes the cosine term to go from a value of 1 to 0. Thus is it important in certain embodiments to ensure very high phase stability in the measurement. This can be extremely tricky to achieve, because of the short wavelength of UV/visible light. For example, using a probe beam with a wavelength of 532 nm, the sensitivity varies from maximum to zero over just 133 nm. In some embodiments, it may be desirable to maintain the optical phase stable to within 10 nm or even 1 nm to maintain maximal sensitivity. But this can put extreme constraints on the optomechanical design of such a microscope. One issue is related to the thermal stability of the system. For example, if the system has a mechanical path length of ~0.1 m, and a thermal expansion coefficient of $2 \times 10^{-5}/°$ C., a 1 degree C. temperature difference between the signal and reference arm would cause a 2000 nm change in relative path length. Because this is much larger than the acceptable tolerance of 1-10 nm, in various embodiments one or more strategies to overcome this instability.

According to embodiments, it is possible to use materials with extremely low thermal expansion coefficients for example Invar, Zerodur or similar, but this may not be practical, especially if one wishes to use commercially available optics and stages. It is also possible in other embodiments to construct a temperature stabilized enclosure. To achieve 1 or 10 nm of stability with a thermal expansion coefficient of $2 \times 10^{-5}/°$ C., it is necessary to stabilize the system temperature to within $5 \times 10^{-5}$° C. (1 nm) or $5 \times 10^{-4}$° C. (10 nm). While this is possible in principal, it can require a complex and expensive engineering solution and may require undesired long stabilization times, for example when a sample is exchanged.

Preferred schemes for stabilization of the optical phase difference φ can include implementing a measurement and control system that actively measures the optical phase and then uses for example a PID feedback system to control an actuator to move a reference reflector to remain at the desired phase. For example, Zurich Instruments has published an applications note entitled "Interferometer Stabilization with Linear Phase Control Made Easy" in August 2018 that describes a suitable scheme of dithering the optical phase slightly and using a mathematical model to extract the instantaneous optical phase. The application note describes a somewhat complex method using values for specific Bessel functions to scale two different lock-in demodulator amplitudes to then extract a quantitative value for the optical phase. In practice, a simpler approach can be used to extract a signal that is simply indicative of the optical phase and then empirically determining the optimal value of this phase indicative signal that produces the best photothermal response. Such a phase indicative signal, for example, can be constructed using simple measurements of two lock-in demodulator outputs, $X_1$ and $Y_2$, where $X_1$ is the in-phase demodulation of the detector signal response at the phase modulation frequency f and $Y_2$ is the quadrature demodulation of the detector signal at 2f (twice the phase modulation frequency). The scaling of these factors by the Bessel function amplitudes and/or operating at a modulation depth where the two Bessel amplitudes are the same can provide an absolute measurement of the phase, but is not necessary to simply operated at a fixed (if unknown) optical phase.

A phase feedback scheme is illustrated schematically in FIG. 2, where a modulation signal 152 is applied to an actuator 158 which dithers a reference reflector 105 by a small amount. The demodulator 134 (for example a multi-frequency lock-in amplifier like those manufactured by Zurich Instruments) can be used to determine the optical phase difference φ and send a corresponding signal 146 (per the aforementioned application note or alternate discussion above). This optical phase signal 146 can be sent to a PID loop 148 which when compared to a setpoint (labeled SP), generates a control signal 150 that is summed with modulation signal 152 at summing junction 156 and then used to dynamically adjust the position of actuator 158 to maintain reference reflector 105 at the desired optical phase for maximal sensitivity. Note that the PID loop could alternately actuate any other device that can change the relative phase in the reference and/or sample arm, for example a liquid crystal phase modulator, a rotating retroreflector, or any other device that can adjust the optical phase as a function of an input control signal.

Figure 5:
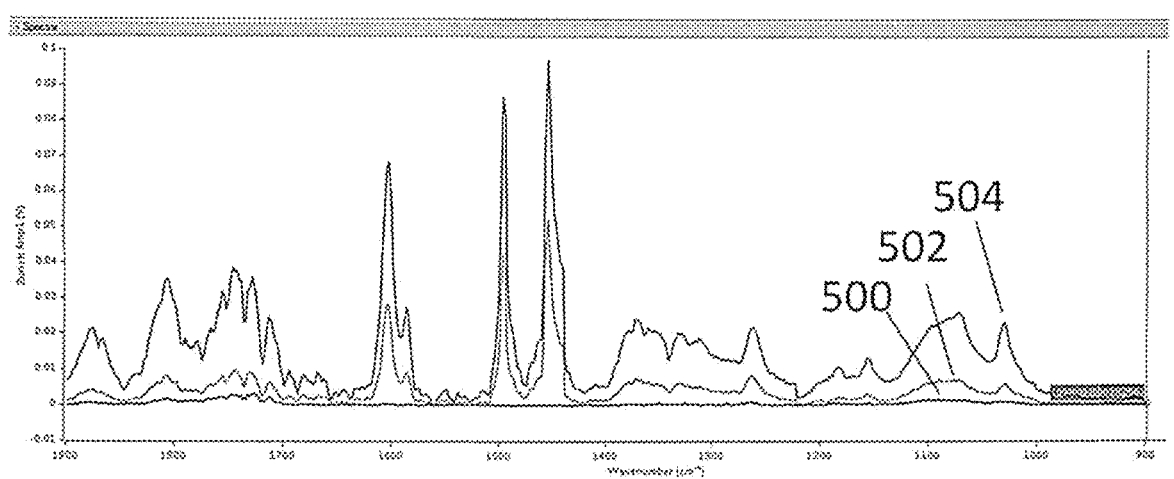
FIG. 5 depicts the effect of phase difference control in addition to interferometric systems as shown in FIGS. 2 and 3.

FIG. 5 illustrates the use of this form of active phase stabilization by depicting three spectra 500, 502, and 504. Spectrum 500 was taken without interferometric detection. Spectrum 502 was taken with asymmetric interferometric detection, but with no phase stabilization, and spectrum 504 was taken with active optical phase stabilization as described above. Spectrum 500 shows minimal signal strength as no interferometric amplification was used. Spectrum 502 shows some amplification, but without maximal sensitivity. The spectra shown are in fact averages of 10 individual spectra, so spectrum 502 represents the average spectrum that was obtained while the optical phase and hence measurement sensitivity was varying in an uncontrolled fashion during the measurement. Spectrum 504 was measured with the optical phase feedback system active and hence maintained optimal sensitivity throughout the measurement, resulting in a consistently larger signal level.

Figure 6:
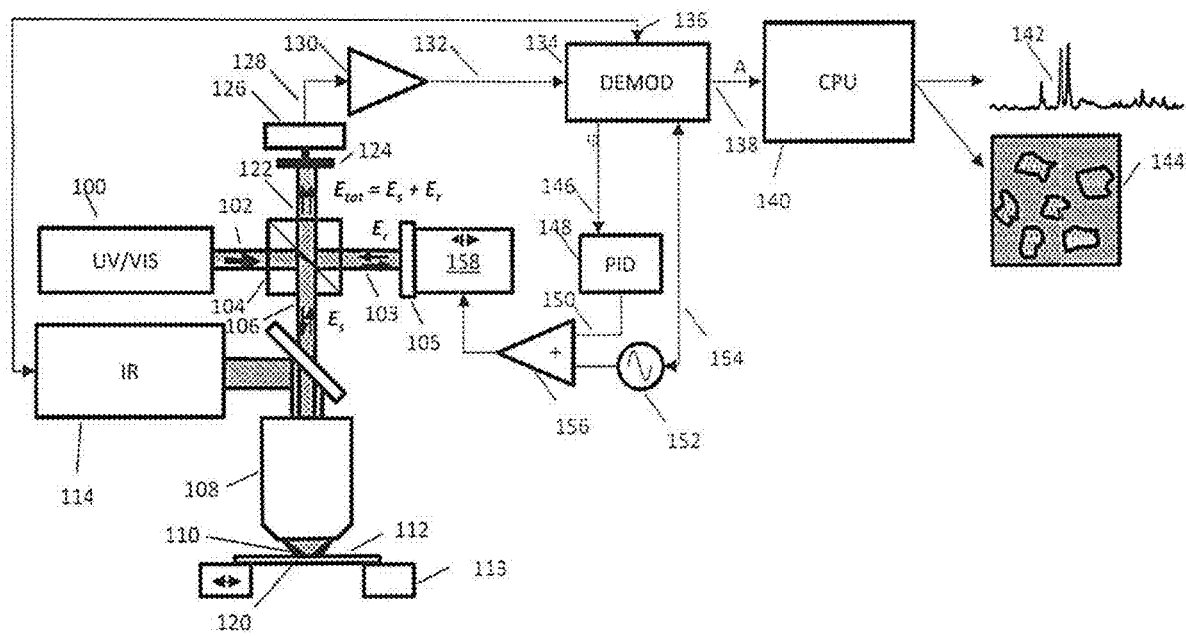
FIG. 6 shows an embodiment of an interferometric photothermal microscope with topside illumination in which the probe beam and infrared light paths are collinear at the sample and where the sample is illuminated by both beams from the same side of the sample.
Figure 14:
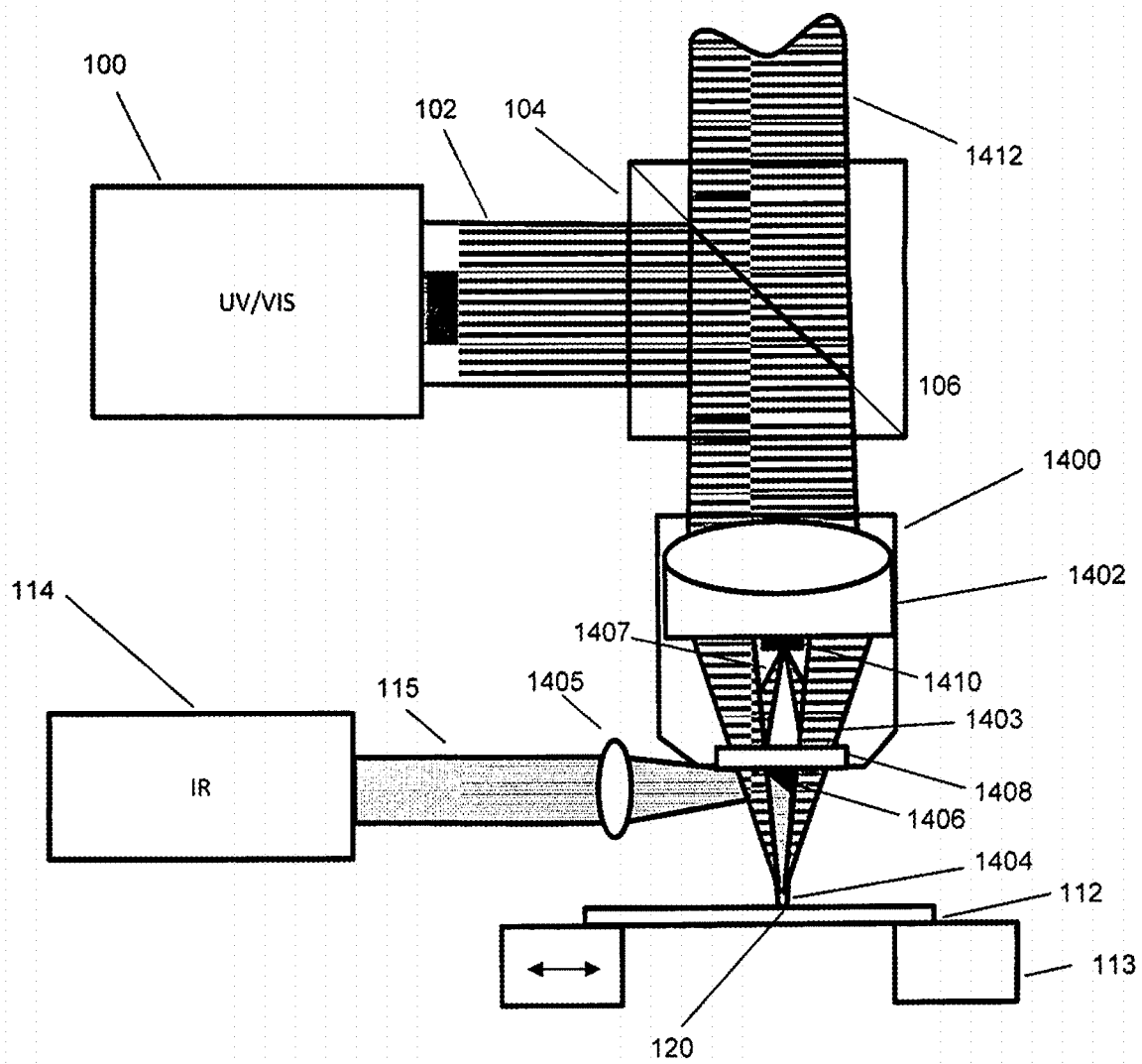
FIG. 14 shows an alternative embodiment employing a Mirau style interferometric objective with an auxiliary infrared beam path.

FIG. 6 shows an alternate embodiment of an interferometric photothermal microscope. FIG. 6 is a variation on the embodiment shown in FIG. 2. Where identical numerical callouts are used, the associated description of FIG. 2 applies to FIG. 6 as appropriate. The primary difference in FIG. 6 is that the embodiment shown in FIG. 6 uses an arrangement where the IR and UV/VIS beams are focused by the same focusing optic 108, producing an IR spot 120 and a focused UV/VIS probe spot 110 that are at least partially overlapped. This provides an arrangement where both the IR and probe beams illuminate the sample from the same side of the sample. This configuration is advantageous for samples that are not transparent to the IR beam. In this case, for example, focusing optic 108 may be a reflective objective for example a Schwarzschild design such that it can simultaneously focus both the shorter wavelength UV/VIS beam and the longer wavelength IR beam. It is also possible to use refractive objectives made of IR transmissive materials, for example barium fluoride, calcium fluoride, zinc sulfide, zinc selenide and/or other IR transparent materials. In the case of using an objective based on IR transparent materials, it can be desirable to construct a lens that provides optimal focus at the UV/VIS probe wavelength, allowing the objective to not be optimized for IR wavelengths. Since the spatial resolution of the system is determined by the spot size of the UV/VIS probe beam, the performance of the system may not be degraded even if the IR beam is somewhat defocused, especially in the case of an excess of IR light from the IR source 114. As with FIG. 2, the UV/VIS beam is configured to pass through an asymmetric interferometer to provide amplified detection of the photothermal response of the sample due to absorption of IR light. In the case of FIG. 6, the IR and probe beams are collinear and both illuminate the sample from the same side of the sample. FIG. 14 will later show an alternative embodiment that uses separate optics to focus the IR and probe beam, but with the IR and probe beam striking the sample from the same side of the sample.

Figure 7:
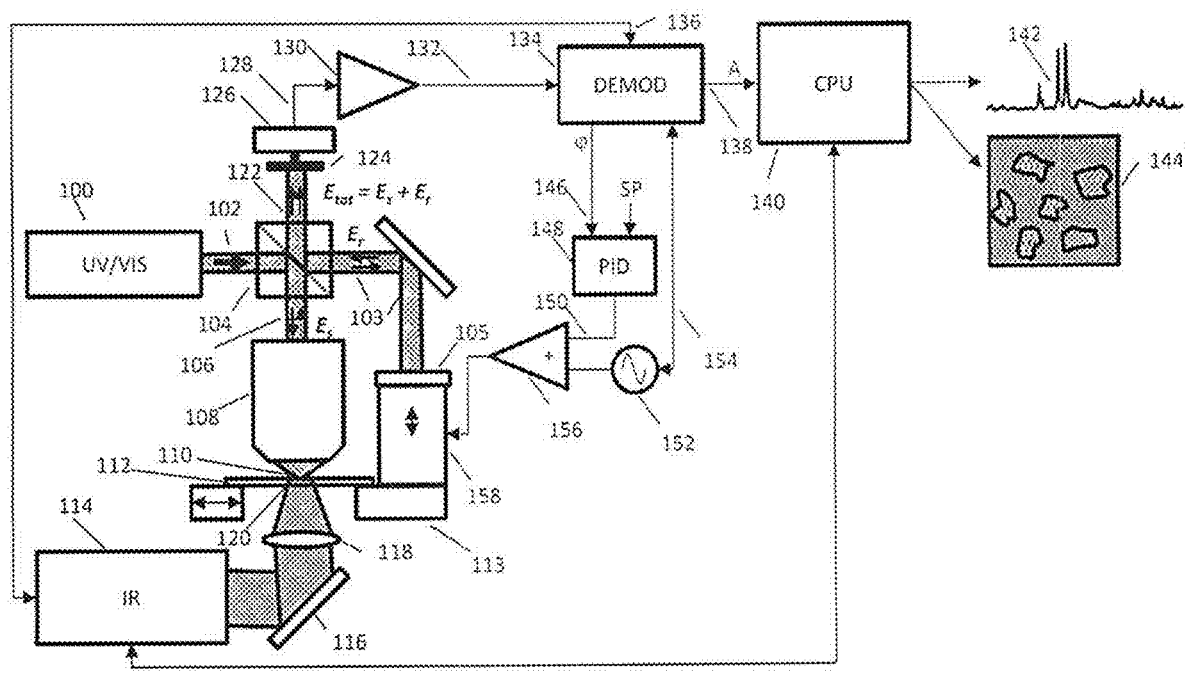
FIG. 7 shows an embodiment of an interferometric photothermal microscope including a subsystem for offsetting environmental vibrations.

FIG. 7 shows an alternative embodiment based on FIG. 2 and where identical numerical callouts are used, discussion from FIG. 2 applies as appropriate. FIG. 7 shows an embodiment where reference reflector 105 is mounted on an actuator 158 which in turn is mounted to the sample stage 113. This arrangement is advantageous as it provides a means to remove common mode motion/vibration that may otherwise compromise the performance of the interferometer. The embodiment shown in FIG. 7 is suited to counteracting deleterious effects from an environmental disturbance that causes a vibration between the structure that holds the interferometer optics and the sample 112. In the arrangement of FIG. 2, such a vibration would cause a change in the relative path length between the sample arm 106 and the reference arm 103 which would cause a change in the interferometer sensitivity and/or noise in the measurement. In FIG. 7, by mounting the reference reflector 105 and actuator 158 to the sample stage 113, any vibration in the interferometer/sample path may also be experienced to substantially the same degree in the reference path 103. This means that the sample and reference path can maintain a substantially constant optical phase difference independent of environmental effects including vibration and temperature drift. The one factor that remains different, however, is the sample's photothermal response. So when sample 112 absorbs IR radiation creating a photothermal distortion in the sample, this only occurs in the sample arm and hence creates a signal.

Figure 8:
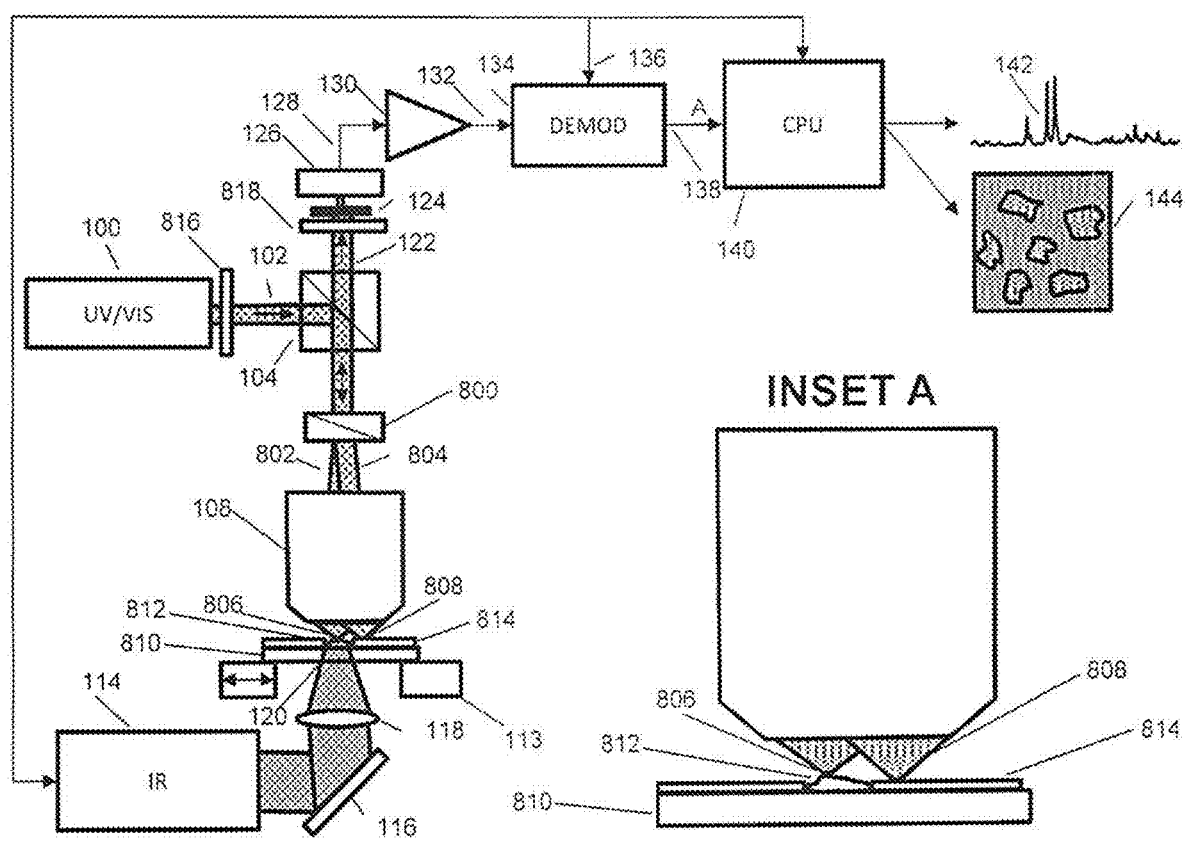
FIG. 8 shows an alternative embodiment based on FIG. 2 employing an alternative technique for stabilizing the phase of the interferometer against temperature drifts.

FIG. 8 shows an alternative embodiment based on FIG. 2 and where identical numerical callouts are used, discussion from FIG. 2 applies as appropriate. FIG. 8 shows an embodiment involving a substantially common path interferometer. In this embodiment a polarization sensitive optical element 800, for example a Nomarski or Wollaston prism is used to divert the incoming probe beam onto two different optical paths 802 and 804 before entering focusing optic 108. Focusing optic 108 can then produce two focused UV/VIS probe spots 806 and 808 on sample 112. One of these focused probe spots 806 is arranged to illuminate specimen 812 and to at least partially overlap with the IR beam 120 whereas the other focused probe spot 808 is arrange to substantially not overlap with IR beam 120. Light from spots 806 and 808 reflect back into focusing optic 108 where they are recombined by polarization sensitive optic 800. Once recombined, these two beans can pass back through beam splitter 104 on path 122 to detector 126, optionally passing through additional conditioning optics 124. The light at the detector is then the interferometric combination of UV/VIS probe light that strikes IR illuminated regions of the sample (spot 806) and a reference region (spot 808) that is not illuminated by IR light. This arrangement provides an elegant means to provide largely common path interferometric detection for excellent temperature and vibration insensitivity.

The benefits of asymmetric interferometry as described above can also be provided by using a sample substrate 810 with a highly reflective reference region 814, illustrated more clearly in INSET A of FIG. 8. This embodiment may be useful, or example, for life sciences samples in which a patterned substrate that has reflective regions can be used as a reference reflector achieving asymmetric interferometry with a common path embodiment. For example sample substrate 810 can comprise at least one region that is substantially transparent to allow IT light beam 120 to strike specimen 812. Other regions of sample substrate 810 can be patterned with one or more highly reflective regions 814 that will return a substantial fraction of the incident Probe radiation from spot 808 back into the focusing optic 108 to provide a return reference beam that is generally much stronger than the light from the specimen from spot 806. With this sort of arrangement, it is possible to achieve up to around 99% reflectivity from spot 808 that will be much larger than the ~4% light reflected from a transparent specimen. In the case of a dark or highly scattering sample where the amount of light returned from the sample is small, the benefit will be even greater. It is also possible to use an unpatterned sample substrate and simply using the reflection off of a region of the specimen or sample substrate that is not illuminated by the IR beam as a reference. Additional optics may also be put in the beam path as desired to improve the performance. For example a polarizer 816 may be placed in the path of the UV/VIS probe beam to control the amount of light of each polarization entering the polarization sensitive device 800, for example to balance the interferometric detection or to ensure that the reference arm has more light to take advantage of asymmetric interferometric amplification. An analyzer 818 can also be placed in the detection arm, for example to reduce or null the amount of light to the detector in the absence of IR absorption. In this case, when the sample does absorb IR light, the resulting photothermal distortion in the sample will cause an increase in the amount of light to the detector. This arrangement can be advantageous as it allows the detector to work in a low-light mode where the signal to noise ratio can be limited by detector noise, rather than the shot noise from the large DC light background. Analyzer 818 can also be placed in any of the other configurations described herein, for example FIG. 2 with similar benefit. The arrangement of FIG. 8 can also benefit from interferometric quadrature detection, i.e. simultaneous recording of the interference signal of at least two different detectors with a relative optical phase difference between the two detectors. This approach allows the reconstruction of an optimal interferometric signal independent of the relative phase between the sample and reference arm. This approach will be discussed in more detail below associated with FIGS. 10-11.

Figure 9:
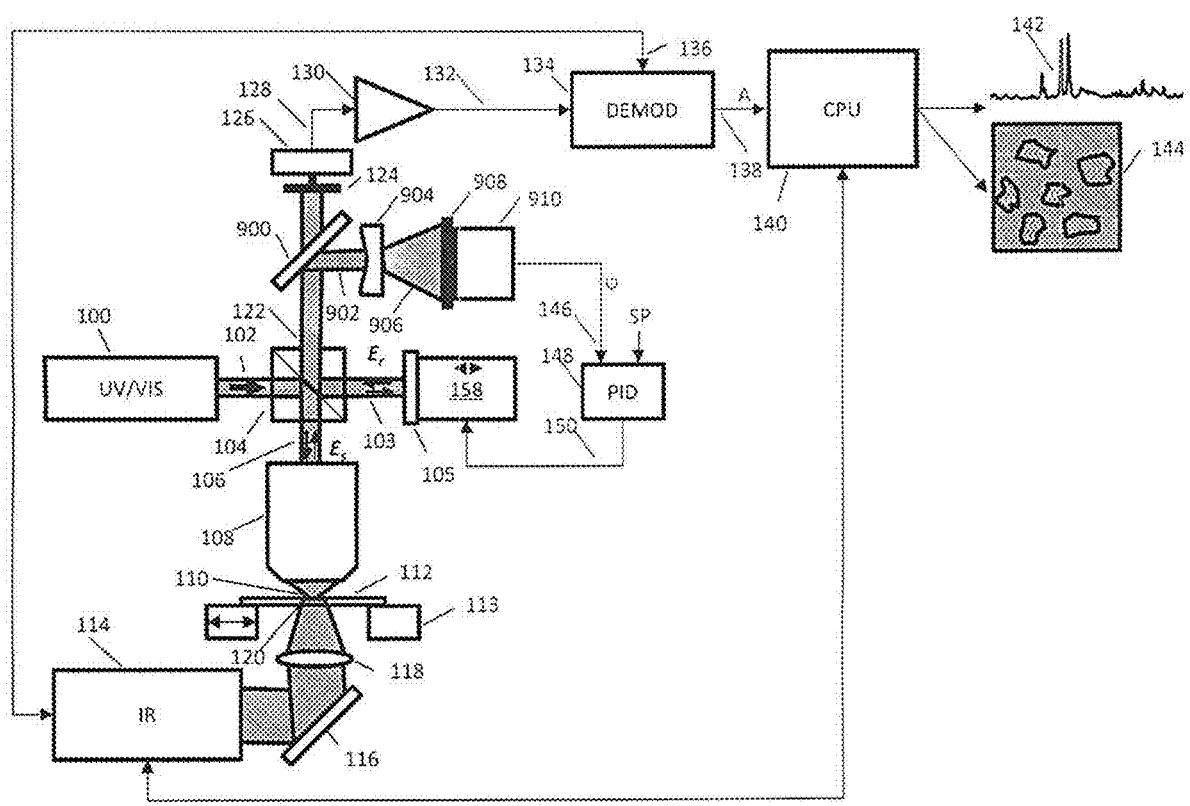
FIG. 9 shows an alternative embodiment based FIG. 2-3 with the use of fringe tracking for phase difference control.

FIG. 9 shows an alternative embodiment based on FIG. 2 and where identical numerical callouts are used, discussion from FIG. 2 applies as appropriate. FIG. 9 shows an embodiment employing fringe tracking scheme, an alternative technique for stabilizing the phase of the interferometer against temperature drifts. In this embodiment, a beam sampler 900 picks off a generally small portion "pickoff beam" 902 of the interfering beams 122 on the way to detector 126. This pickoff beam 902 is sent to detector 910 which monitors the position of one or more interferometric fringes to produce a signal indicative of the relative optical phase between the sample and reference arms of the interferometer. Pickoff beam 902 is optionally sent through beam expanding optics 904 and mask 908 to select a sub-portion of the interfering beams, e.g. to isolate for example a single fringe section. By placing a sub-portion of the interference pattern on the detector 910 it is possible to measure changes in the position of the fringe by tracking the changes in the position and/or amount of light hitting the detector. For example the detector may be a position sensitive diode, e.g. a split segment photodiode or a lateral effect diode when the output signal is proportional to the position of the centroid of the beam. It is also possible to use an array detector or even a camera to track changes in the position of the beam. Optional diverging optics 904 may comprise a simple plano-concave lens for example, or any alternate lenses, mirrors or combinations thereof that magnify size). A manual or automated translation stage can also be provided to provide relative translation between the beams 902/906 and detector 910 to provide optimal phase sensitivity. The signal indicative of phase 146 is then sent to a PID or other control loop 148 as described previously associated with FIG. 2. This interference pattern pickoff scheme can also be used with the other interferometric schemes described herein, for example FIGS. 4-9. Another suitable scheme for dynamically locking the phase of the interferometer is described in "Achieving unlimited recording length in interference lithography via broad-beam scanning exposure with self-referencing alignment" by Ma et al (Scientific Reports 7(1) November 2017, DOI: 10.1038/s41598-017-01099-3). See for example Fig 3 of the Ma reference and associated discussion of fringe locking technique.

Figure 10:
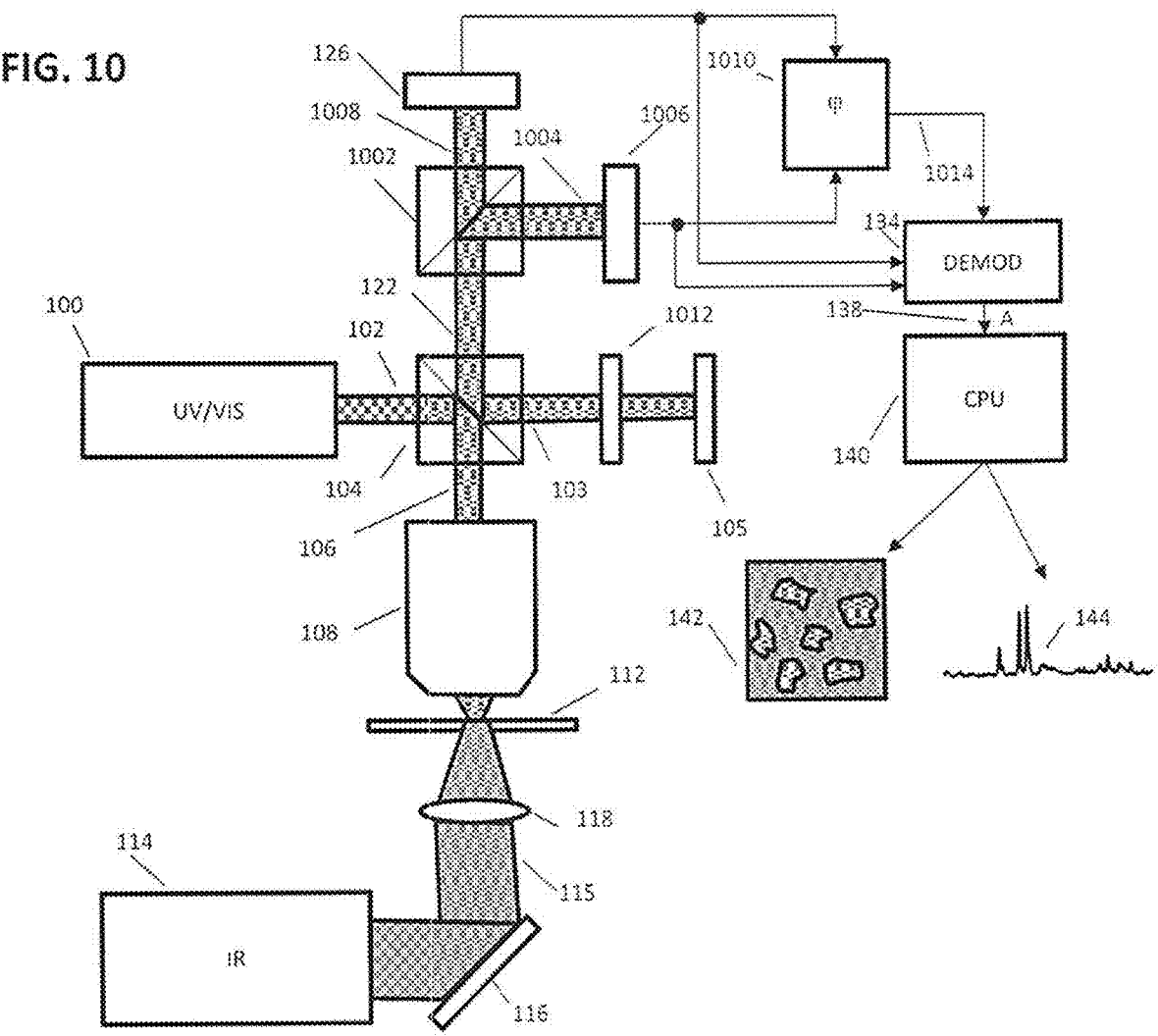
FIGS. 10 and 11 shows an alternative embodiment based on FIGS. 2-3 with a quadrature phase detecting interferometer using up to four detectors.

FIG. 10 shows an alternative embodiment based on simplified schematics of FIG. 2-3 and where identical numerical callouts are used, discussion from FIGS. 2-3 applies as appropriate. FIG. 10 shows a simplified conceptual diagram regarding the use of quadrature interferometry to provide a continuous readout of the interferometer phase independent of relative optical phase between the sample and reference arms of the interferometer. This provides a means to extract a real-time measurement of the photothermal distortion without the need to dynamically adjust the position of the reference reflector 105. This will be discussed in more detail associated with FIG. 11 as well. The interferometer of FIG. 10 is configured similar to that of FIG. 3, with some notable additions.

In various embodiments, the interferometer of FIG. 10 can be configured to split the interfering light between two detectors 126 and 1006 and arranged such that the interfering light at detector 126 and detector 1006 have an optical phase shift relative to each other. In a preferred embodiment, the two detectors are arranged to be in "quadrature" such that there is a relative optical phase of around 90° between the two detectors. This can be achieved in a variety of ways. Three such ways are described in references: (1) Y. Elsworth and J. James, "An optical screw with a pitch of one wavelength," Journal of Physics E: Scientific Instruments 1973 Volume 6; (2) M. Doboszy, T. Usuda and T. Kurosawa, in "Methods for the calibration of vibration pick-ups by laser interferometry: I. Theoretical analysis," Meas. Sci. Technol. 9 (1998) 232-239; and (3) P. Gregorčič et al "Quadrature phase-shift error analysis using a homodyne laser interferometer (Optics Express Vol. 17, Issue 18, pp. 16322-16331 (2009)), each of which are incorporated herein by reference. The first two techniques are further illustrated at this web site: https://sites.google.com/a/umn.edu/mxp/advanced-experiments/quadrature-michelson-interferometer, which is also incorporated herein by reference.

For example, the input beam 102 can have its polarization rotated by 45° before reaching beam splitter 104. This can be achieved for example using a polarizer or half wave plate 1016 or by rotating the UV/VIS light source 100. Next, beam 122 on the return path to the detector 126 is split by a second beam splitter 1002 to send a first portion 1008 of beam 122 to a first detector 126 and a second portion 1004 of beam 122 to a second detector 1006. The beam splitter 1002 can be a polarizing beam splitter such that light of one polarization proceeds on path 1008 to detector 126 and light of the other polarization proceeds on path 1004 to detector 1006.

In one embodiment, for example, using the approach of Gregorčič, wave plate 1012 in the reference arm along path 103 can be an eighth wave and the polarization of the input beam is arranged at 45° with respect to the fast axis of the eighth wave plate. Light returning from the sample arm on path 106 will contain both polarizations, but it will have accumulated a total of a 90° optical phase difference between the two polarizations. Polarizing beam splitter 1002 then divides this light onto two paths 1008 and 1004. Interference between the sample and reference beams occurs on both paths 1008 and 1004, but the two interfering paths are nominally 90° out of optical phase with each other. The two detectors 126 and 1006 then record so-called quadrature versions of the interferometric signal. Alternatively, wave plates 1012 and 1018 can be quarter wave plates rotated at approximately 22.5° and 45° respectively as described by Y. Elsworth and J. James in "An optical screw with a pitch of one wavelength," Journal of Physics E: Scientific Instruments 1973 Volume 6 and as illustrated further at the web site: https://sites.google.com/a/umn.edu/mxp/advanced-experiments/quadrature-michelson-interferometer.

The net result of these approaches is that, by simultaneously recording quadrature signals, it is no longer necessary to stabilize the phase of the interferometer as it is possible to mathematically construct the phase using the signals from detectors 126 and 1006. And of particular significance, the use of this quadrature scheme can result in the generation of an IR absorption that is substantially independent of a relative optical phase of the interferometer.

One scheme for constructing the phase signal in accordance with an embodiment is detailed in "Quadrature phase-shift error analysis using a homodyne laser interferometer" by Gregorčič et al (Optics Express Vol. 17, Issue 18, pp. 16322-16331 (2009)). Phase computation module 1010 takes in the signals from detectors 126 and 1006 to produce a signal 1014 that is indicative of the relative optical phase in the interferometer. Phase computation module can be implemented for example on a digital signal processor (DSP), field programmable gate array, real-time computer or similar computation means which can provide a substantially continuous indication of the optical phase sufficient for real-time measurements. The computation may also/instead performed by demodulator 134, for example using computation functions of a lock-in amplifier. Such computation can also be performed with analog electronics, for example with analog divider circuits. It is also possible to simply record the detector signals with a data acquisition system and then post process the signals in a personal computer or other similar device. The phase computation module may also incorporate various calibration factors to produce more accurate estimates of the phase, and/or any correction factors to account for or compensate for any non-ideal response in the quadrature detection, due for example to differences in signal levels in the two quadrature arms, differences in intensity in the signal and reference arm, any optical imperfections in the optics, nonlinearities in the electronics, etc. This approach can be advantageous for ensuring that the detected phase signal has a well-behaved relationship between the computed phase signal and the IR absorption in the sample, so as to generate IR absorption spectra with meaningful band ratios that can be used to either quantitatively analyze chemical content in a sample and/or compare to library reference spectra.

In any of the cases above, the phase indicative signal 1014 can be further demodulated to measure a signal 138 indicative of IR absorption by the sample. For example, signal 138 can measure an amplitude of change in the phase signal 1014 as a function of IR illumination of the sample. For example, if the IR beam 115 is pulsed, chopped or otherwise modulated, the phase indicative signal can be demodulated synchronously with the IR modulation frequency, for example with a lock-in amplifier. Alternately, a differential signal can be created by rapidly comparing the phase signal 1014 with the IR beam 115 on and off. Alternately, the signal can be measured by synchronously co-averaging the phase signal 1014 at the modulation rate of the IR beam 115 and extracting a difference signal based on the value of the averaged phase signal at different times relative to the IR illumination. For example, in the case of a pulsed IR source, it is possible to measure the average phase signal shortly after the completion of the IR pulse and compare that to a time either before the IR pulse or after the sample temperature rise has decayed sufficiently towards the baseline. A more detailed procedure for extracting the both the DC phase and a photothermal modulation amplitude is described in more detail below in the section labeled "Numerical extraction of photothermal phase modulation signal" and the description of FIGS. 15-17.

Figure 11:
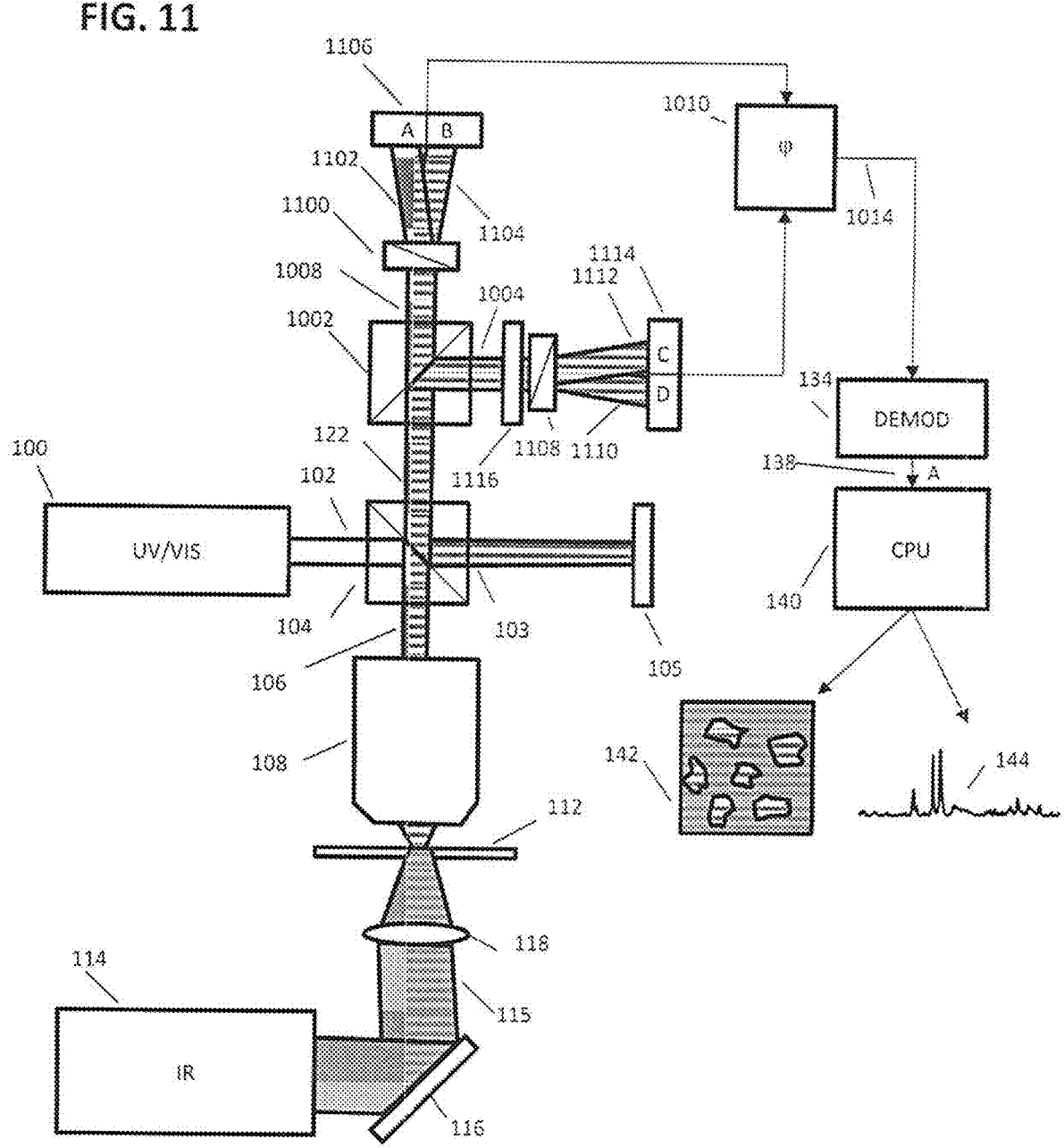

FIG. 11 shows an alternative embodiment based on FIG. 10 and where identical numerical callouts are used, discussion from FIG. 10 applies as appropriate. FIG. 11 shows a simplified schematic diagram of a photothermal microscope with a quadrature phase detecting interferometer using up to four detectors. The apparatus shown in FIG. 11 substantially follows the layout of the apparatus in FIG. 10 up until the output of beam splitter 1002. At this point, beam 1008 is divided onto two additional separate paths 1102 and 1104 based on polarization by a polarizing sensitive optic 1100, for example a Wollaston filter, a Nomarski prism, a calcite plate, or other birefringent beam displacing element. Depending on the polarization sensitive optic 1100 as well as any other focusing optics used (not shown), beam paths 1102 and 1104 may be angled (as shown) or parallel. In either case, the beams on paths 1102 and 1104 are sent to two elements (A, B) of a detector array 1114, or to two different detectors.

Similarly, the light on path 1004 is divided by a second polarization sensitive optic 1108 and directed on paths 1110 and 1112 to two elements (C, D) of detector array 1114. One of the optical paths from beam splitter 1002 also has an additional quarter wave plate 1116 such that there is a 90° phase shift between the light on optical path 1004 versus 1008, thus providing for quadrature detection. The signals from detectors 1106 and 1114 are directed to the phase computation module 1010 and a signal indicative of phase 1014 is calculate in a fashion similar to that of FIG. 9, except that the phase computation module of FIG. 10 will be using up to four detector signals instead of just two in FIG. 9. Suitable calculations are detailed in "Quadrature phase interferometer for high resolution force spectroscopy" by Paolino et al (Review of Scientific Instruments 84, 095001 (2013), https://doi.org/10.1063/1.4819743) and the references therein.

Heterodyne interferometry, for example as described in U.S. Pat. No. 4,834,111, can also be applied to optical photothermal infrared microscopy. The use of heterodyne interferometry can be advantageous since it produces a signal indicative of the relative optical phase between the sample and reference arm, but is insensitive any laser power fluctuations in either arm. Heterodyne interferometry works by modulating the optical frequency (or equivalently phase) of the light in one or both of the interferometer arms, for example with an acousto-optic modulator (AOM), electro-optic modulator or similar device. At the detector, the interfering light beams generate sidebands at the difference frequencies between light in the two arms of the interferometer. The modulation of the optical frequency is typically performed at radio frequencies and thus the resulting sidebands occur at radio frequencies. The sidebands can be detected with high sensitivity using phase sensitive electronic detection (for example a lock-in amplifier), narrow band filters, and/or through the use of resonant amplifiers tuned to the desired RF frequency.

Figure 12A:
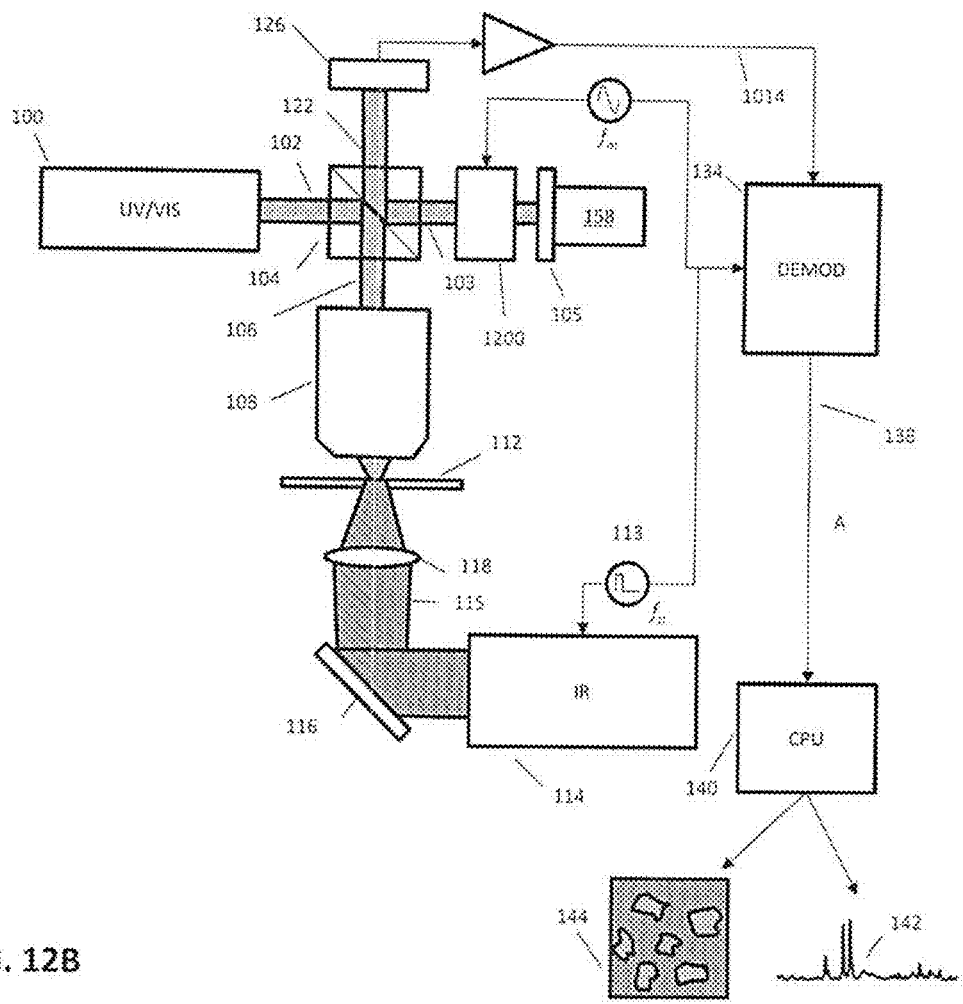
FIG. 12A shows an alternative embodiment based on FIG. 2 using heterodyne interferometric detection.

FIG. 12 shows an example embodiment using heterodyne interferometry. FIG. 12 is based on FIG. 2 and where identical numerical callouts are used, discussion from FIG. 2 applies as appropriate. FIG. 11 shows a simplified schematic diagram of a photothermal microscope using heterodyne interferometric detection. The embodiment in FIG. 12A is similar to other embodiments, with the addition of at least one phase modulator 1200 included in at least one of the sample arm or reference arm of the interferometer. The phase modulator 1200 can be used to periodically modulate the relative phase between the sample and reference arm. Equivalently, the modulator can be viewed as periodically modulating the wavelength/optical frequency of the light. This modulation of the relative optical phase will lead to signals at sideband frequencies that can provide for efficient detection photothermal responses in the sample.

Figure 12B:
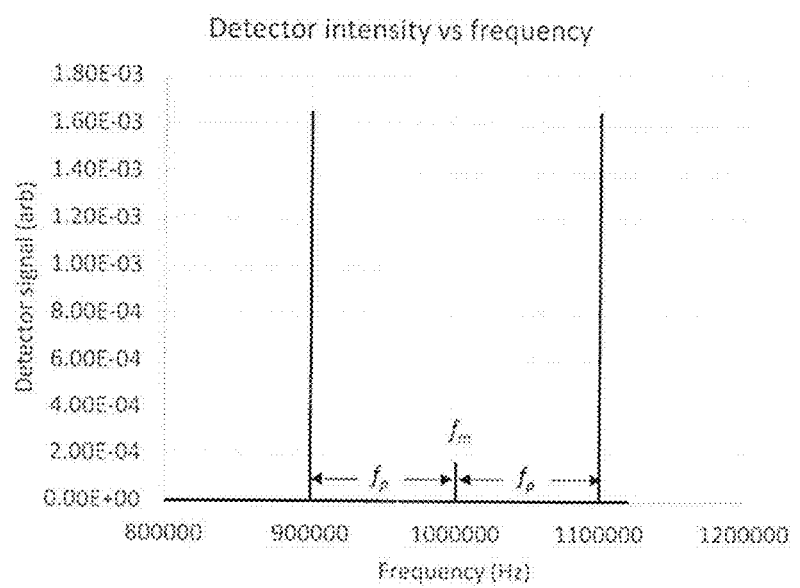
FIG. 12B shows a detector intensity versus frequency plot for the exemplary heterodyne interferometric detection system of FIG. 12A.

Specifically consider if the IR source 114 is pulsed, chopped or otherwise modulated at frequency $f_p$ (thus inducing a photothermal response at $f_p$ and its harmonics) and the phase modulator 1200 is modulated at a frequency $f_m$. The nonlinear mixing that occurs due to interference at the detector will generate signals at $mf_m \pm nf_p$ where m and n are integers, as illustrated in FIG. 12B for m and n=1. (More sidebands with m or n>1 may be generated if there is an anharmonic photothermal response, i.e. a periodic photothermal response that has significant energy at higher harmonics of $f_p$.) If demodulator 134 is a multi-frequency lock-in, it is possible to measure the amplitude of one or more of these sideband amplitudes and use this to construct a signal indicative of the photothermal response of the sample and hence a signal indicative of the IR absorption of the sample.

The figures and associated descriptions herein outline various embodiments for interferometric mid-IR photothermal microscopes. Note that the elements of these embodiments can be used in many cases either separately or together. For example, although the quadrature interferometric scheme of FIGS. 10 and 11 are shown in a counter-propagating geometry (i.e. IR from the bottom, UV/VIS from the top), this approach can work similarly on an upright geometry, e.g. that illustrated in FIG. 6, where both the IR and Probe radiation approach the sample from above. In fact, all of the schemes described herein can be operated in either the counter-propagating or upright configuration, or even other schemes where the IR light illuminates the sample from another angle, for example at an inclined angle from the side as shown in co-pending application US 2018/0180642 A1. And, for example, the heterodyne technique of FIGS. 12A and 12B, could be combined with the fringe tracking scheme of FIG. 9 or the phase feedback scheme described associated with FIG. 2. In some embodiments, the vibration insensitive scheme of FIG. 7 could employ the quadrature detection scheme of FIG. 10 or 11. If phase modulator 1200 if configured with sufficient range, it can also be used to adjust the DC phase of the interferometer if desired, eliminating the need for a separate reference reflector actuator 158.

Figure 13:
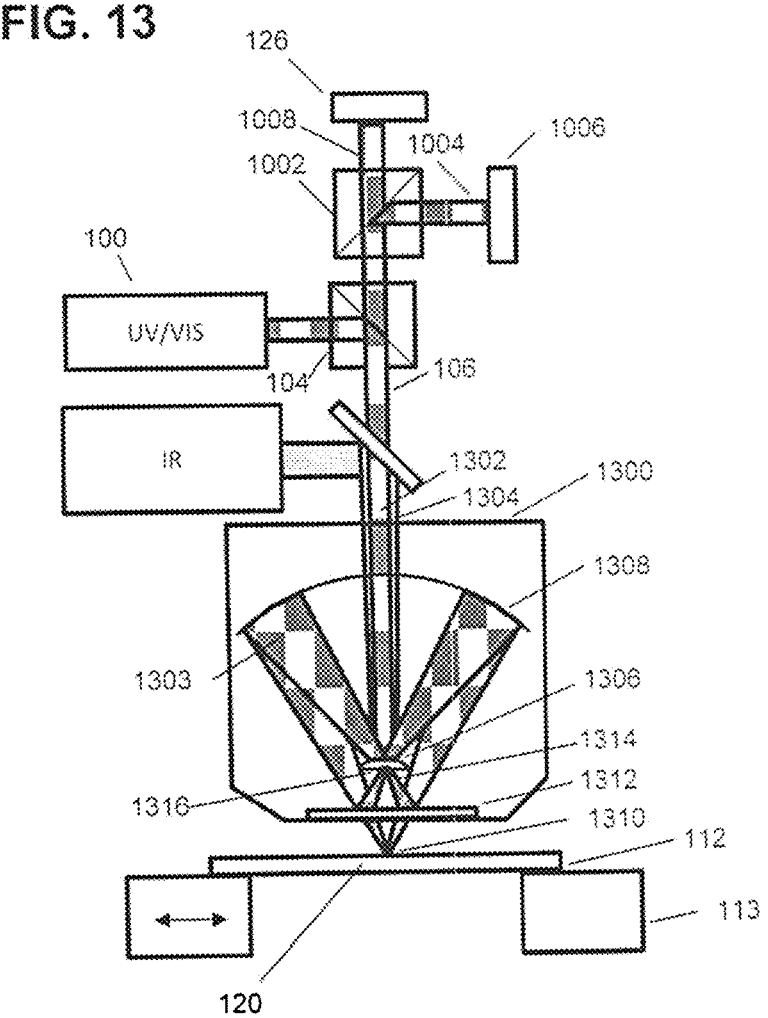
FIG. 13 shows an example embodiment using a novel inteferometric objective.

FIG. 13 shows an example embodiment using a novel interferometric objective. FIG. 13 is based on FIGS. 2 and 10 and where identical numerical callouts are used, discussion from FIG. 2 applies as appropriate. FIG. 13 shows an interferometric objective 1300 which is used to focus both IR light 1304 and UV/visible probe light 1302 onto sample 112. For the sake of clarity, only the UV/VIS beams 1303 are shown as they propagate through objective 1300. Objective 1300 can be of a Schwarzschild design comprising at least two mirrors 1306 and 1308. The first mirror 1306 causes the incoming beam to diverge and be directed up to larger second mirror 1308 that refocused the beam to a spot 1310 on sample 112. This reflective configuration is advantageous as it can focus both the IR and UV/VIS beams at substantially the same focal distance due to the lack of dispersion in the mirrors.

In some embodiments, this objective has an additional feature that lets it perform as a common path interferometer. Specifically, partial reflector 1312 is placed in the beam path so that it can act also as a Mirau inteferometric objective. In this case, a portion 1314 of the UV/VIS beam can be reflected up to a reference reflector 1316, for example on the back of first mirror 1306 or alternately a separate reflector. The distance between the top of partial reflector 1312 and reference reflector 1316 is chosen to be substantially similar to the optical path distance from partial reflector 1312 to the plane where focused spot 1310 in incident on the sample 112. In this way, light reflecting from the sample 112 and the reference reflector 1316 will interfere on the return path to the detector 126 and optional detector 1006. Partial reflector 1312 may be replaceable and/or adjustable to compensate for changes in the reflectivity of sample 112. In one embodiment, partial reflector 1312 is an optic with a variable amount of reflectivity such that rotating or sliding the reflector can be used to tune the relative amount of light that is reflected from its surface. Partial reflector 1312 may also have an adjustable position, for example to adjust the relative optical phase between the light reflecting from the partial reflector 1312 and the sample 112. Such adjustment can be manual, motorized, actuated with an electronically controllable actuator, for example piezoelectric device, voice coil or other device that moves in response to an input signal. In some cases it may also be desirable to enable a tip/tilt adjustment such that the sample 112 and partial reflector 1312 are sufficiently parallel to enable interference and the detector 126. Partial reflector 1312 is also chosen to be at least partially transmissive to IR light such that both IR and probe radiation can be focused by the objective.

In these embodiments, objective 1300 is able to perform a novel feat, being able to focus both IR and probe radiation while simultaneous acting as an interferometric objective. Conventional Schwarzschild objectives have no interferometric measurement ability and conventional Mirau objectives are made of refractive elements (lenses) that are not transmissive to mid-IR light. This embodiment provides the capability to perform topside illumination with both IR and Probe radiation and provide inteferometric detection of the photothermal response of the sample due to absorption of IR light by the sample. Partial reflector 1312 is preferentially chosen to be very thin such that it causes minimal chromatic aberrations due to the difference in index of refraction between IR and visible light. A thin compensation plate (not shown) may also be put into the reference path before reference reflector 1316 to compensate for the fact that the UV/VIS probe light on the path to the sample passes through the thickness of partial reflector 1312, whereas the light on the reference arm does not.

After probe light 1310 interacts with sample 112 and returns back though objective 1300, recombining with reference light reflected from reference mirror 1316, the combined light is passed together back on the detector path for example back through beam splitter 104. Optional beam splitter 1002 can be used to divide the returning beam into two portions 1004 and 1008 and sent to two or more quadrature detectors 126 and 1006 as described associated with FIG. 10 or FIG. 11. Quadrature detection in advantageous in this situation as it eliminates the need to make a phase adjustment between the reference reflector 1316 and the sample 112. As with previously discussed embodiments, the detector signals can then be sent to amplifiers, signal conditioners, demodulators, and/or phase computation modules in any combination or any subset as desired. This embodiment also supports amplification via asymmetric interferometry. Reference reflector 1316 can be a high reflectivity reflector and with no attenuation in the reference path such that the light returning on the reference path is much stronger than light returning on the sample path. Note that a conventional Mirau refractive objective can also be used in counter-propagating geometry like that shown in FIG. 2, or in any scheme where the IR light is brought in from the side.

FIG. 14 shows an alternative embodiment employing a Mirau style interferometric objective for the UV/VIS probe light and a separate beam path for the IR beam. FIG. 14 shares aspects with FIG. 2 and where identical numerical callouts, the description associated with FIG. 2 applies as appropriate. In this embodiment probe radiation 102 from UV/VIS light source 100 is incident on beam splitter 104 which sends a portion of the probe beam towards interference objective 1400. Interference objective has one or more optical elements 1402 that serve to focus the probe beam 1403 to a spot 1404 on sample 112. Partial reflector 1408 directs a second portion 1407 of probe beam 1403 to reference reflector 1410. Probe radiation returns from both the sample 112 and reference reflector 1410 on a path similar to the input beam path such that light from the sample and reference reflector interfere on the path to the detector 1412. The description on objective 1402 to this point describes the operation of a conventional Mirau style objective.

Conventional Mirau objectives are designed for visible light using refractive components that are generally not transparent to mid-IR radiation. This embodiment provides an alternative approach to enable simultaneous mid-IR illumination in support of the mid-IR photothermal microscopy. Specifically OPTIR technique, IR radiation 115 is emitted from an IR source 114 and optionally focused by optic 1405. A small prism 1406 is mounted to objective 1400 and serves to reflect the IR beam to a location 120 on the sample 112 at least partially overlapping with the probe beam focused spot 1404. The prism is chosen to be sufficiently small such that it obscures a relatively small portion of the area through which the PROBE beam 1403 is being focused to the sample. Suitable prisms are available for example from Tower Optical Corporation in sizes down to 0.5 mm. This can be small enough that its obscuration has a minimal impact on the achievable spatial resolution and/or contrast of objective 1400. The spatial resolution and contrast of an objective are set in part by the numerical aperture of the objective along with any deleterious effects from a central obscuration, i.e. the percentage of the area of the cone of light focused by an objective that are blocked by opaque structure of the objective. For example, a Schwarzschild objective can have a central obscuration area as high as ~50% due to the first mirror that blocks a significant portion of light being focused by the second mirror. The embodiment of FIG. 14 can achieve high performance with a much, much smaller central obscuration area. For example a 40×, 0.5 NA Mirau objective can have a final lens at the bottom of the objective with a diameter of 12.7 mm in diameter. Using the scheme of FIG. 14 and using even a 1 mm square prism represents an obscuration of 0.8% of the area of the final lens. Thus the scheme of FIG. 14 can achieve a central obscuration percentage of <10% and even less than 1%. This is far less, for example than the typical obscuration on a Schwarzschild objective which can be as much as ~50%. Focusing optic 1405 is illustrated as a generic lens, but in practice it can be a single lens, a system of lenses, a mirror (for example an off-axis parabolic mirror), a system of mirrors or any combination thereof.

In some configurations IR focusing optic 1405 may be omitted. For example, if IR source 114 is configured to emit a beam ~1 mm in diameter, the unfocused beam can be directed to prism 1406 and used to illuminate an area of the sample around 1 mm in diameter. This arrangement can be advantageous especially for photothermal detection schemes that employ widefield detection, as described in copending application PCT/US2019/034944 and/or schemes in which the probe beam is scanned over a plurality of locations. In this case having a larger IR beam provides more uniform IR illumination of the field of interest where the widefield and/or scanned probe beam measurements are performed. In any case, when sample 112 absorb IR radiation, it causes a photothermal distortion in IR absorbing regions of sample 112. The photothermal distortions can cause a change in the relative optical phase between the sample 112 and reference reflector 1410. The relative change in phase cause a change the pattern of interfering light on path 1412 to the detector (not shown).

Any of the interferometric detection schemes described above can be used to measure a signal indicative of IR absorption in the sample. Quadrature detection schemes may be advantageous as they eliminate the need to maintain a specific phase relationship between the sample 112 and reference reflector 1410. This embodiment can also support amplification via asymmetric interferometry. Reference reflector 1410 can be a high reflectivity reflector and with no attenuation in the reference path such that the light returning on the reference path 1407 is much stronger than light returning on the sample path. Note that the side illumination scheme of FIG. 14 can also be used with non-interferometric objectives. For example, if partial reflector 1408 and reference reflector 1410 are omitted, but prism 1406 is still included, the objective will serve to illuminate the sample 112 with both IR and probe radiation for mid-IR photothermal microscopy. A suitable objective for this case, for example is the 100×0.70 NA long working distance objective from Mitutoyo which has a 6 mm working distance and an final lens diameter of 12.7 mm. Similarly, this objective can support a 1 mm square prism 1406 with minimal impact on its spatial resolution or contrast and a central obscuration area percentage of less than 1%.

Numerical Extraction of Photothermal Phase Modulation Signal

In this section, one procedure is detailed that can be used to extract a signal indicative of IR absorption through the use of quadrature detection and without requiring a phase feedback loop, and wherein the signal indicative of IR absorption of the sample is substantially independent of the interferometer phase, for example using for example the embodiment illustrated in FIG. 10. FIG. 10 illustrates a scheme with two detectors 126 and 1006 that are arranged to detect light having a 90° optical phase offset between them. In particular, if beam splitter 1002 is a polarizing beamsplitter, then the beamsplitter 1002 divides the incident light 122 onto two paths 1004 and 1008 based on polarization, i.e. that light of one polarization strikes detector 126 and light of the orthogonal polarization will be directed to the other detector 1004. The light with orthogonal polarization on the path to detector 1004 will have incurred a 90° optical phase shift relative to the light at detector 126), i.e. the two detectors are in quadrature. In this arrangement, it is possible to write the intensities striking each detector as:

$$I_x = \tfrac{1}{2}(I_r + I_s) + \sqrt{I_r I_s} \cos \phi \qquad \text{Eq. 13:}$$

$$I_y = \tfrac{1}{2}(I_r + I_s) + \sqrt{I_r I_s} \sin \phi \qquad \text{Eq. 14:}$$

where $I_x$ is the signal at detector 126 and $I_y$ is the signal at detector 1006, and $I_r$ is the power coming from the reference arm 103, and $I_s$ is the power coming on the sample arm 106, and $\phi$ is the relative optical phase between the sample and reference arm.

In this case, it can be assumed that the absorption of IR light at the sample 112 introduces primarily a change to the optical phase $\phi$, without causing a significant change in the reflected intensity $I_s$. In the case that the IR absorption is periodic in time, i.e. in response to periodic pulses from IR source 114, the optical phase vs. time t to first order can be expressed as:

$$\phi = \theta + \psi \sin \omega t \qquad \text{Eq. 15:}$$

where $\theta$ represents the DC phase of the interferometer, $\psi$ is the amplitude of the photothermally induced phase modulation and $\omega$ is the angular frequency associate with the IR source modulation, i.e. $\omega = 2\pi f_r$, where $f_r$ is for example the repetition rate of a pulsed IR laser source or the modulation frequency of a chopper used to modulate the IR intensity.

In some embodiments, the interest is in extracting the photothermal modulation amplitude $\psi$ as it is indicative of the IR absorption of the sample. The signals $I_x$ and $I_y$ have a strong dependence on the DC optical phase term $\theta$, which is often unstable over time, especially absent a phase feedback loop. The scheme described below enables extraction of the photothermal phase modulation amplitude $\psi$ without needing to control the DC phase $\theta$. Instead, the process outlined below enables dynamic measurement of the DC phase $\theta$, and then use of this information to extract the photothermal modulation amplitude $\psi$.

First, Eq. 15 for the dynamic phase $\phi$ is inserted into Eqs. 13 and 14:

$$I_x = \tfrac{1}{2}(I_r + I_s) + \sqrt{I_r I_s} \cos(\theta + \psi \sin \omega t) \qquad \text{Eq. 16:}$$

$$I_y = \tfrac{1}{2}(I_r + I_s) + \sqrt{I_r I_s} \sin(\theta + \psi \sin \omega t) \qquad \text{Eq. 17:}$$

Eqs. 16 and 17 can be rewritten using trigonometric multi-angle formulas as:

$$I_x = \tfrac{1}{2}(I_r + I_s) + \sqrt{I_r I_s}(\cos \theta \cos(\psi \sin \omega t) - \sin \theta \sin(\psi \sin \omega t)) \qquad \text{Eq. 18:}$$

$$I_y = \tfrac{1}{2}(I_r + I_s) + \sqrt{I_r I_s}(\sin \theta \cos(\psi \sin \omega t) + \cos \theta \sin(\psi \sin \omega t)) \qquad \text{Eq. 19:}$$

Jacobi-Anger expansions can be employed for the terms involving $\cos(\psi \sin \omega t)$ and $\sin(\psi \sin \omega t)$. Specifically:

$$\cos(\psi \sin \omega t) \approx J_0(\psi) + 2 J_2(\psi) \cos 2\omega t \qquad \text{Eq. 20:}$$

$$\sin(\psi \sin \omega t) \approx J_1(\psi) \sin \omega t \qquad \text{Eq. 21:}$$

where $J_0(\psi)$, $J_1(\psi)$, and $J_2(\psi)$ are Bessel functions of the first kind.

Plugging Eqs. 20 and 21 into Eqs. 18 and 19, yields:

$$I_x = \tfrac{1}{2}(I_r + I_s) + \sqrt{I_r I_s}(\cos \theta (J_0(\psi) + 2 J_2(\psi) \cos 2\omega t) - s \sin \theta J_1(\psi) \sin \omega t) \qquad \text{Eq. 22:}$$

$I_y = \frac{1}{2}(I_r + I_s) + \sqrt{I_r I_s}(\sin\theta(J_0(\psi) + 2J_2(\psi)\cos 2\omega t) + 2\cos\theta J_1(\psi)\sin\omega t)$ Eq. 23

Examining the terms of Eqs. 22 and 23 in terms of frequency components that would be measured at the detectors, for example using a lock-in amplifier, both equations have DC terms and then oscillatory components at $\omega$ and $2\omega$. Below are the terms of $I_x$ at detector 126 where $I_{x0}$ is the DC term, $I_{x1}$ is the $\omega$ term and $I_{x2}$ is the $2\omega$ term.

$I_{x0} = \frac{1}{2}(I_r + I_s) + \sqrt{I_r I_s} J_0(\psi)\cos\theta$ Eq. 24

$I_{x1} = -2\sqrt{I_r I_s} J_1(\psi)\sin\theta \sin\omega t$ Eq. 25

$I_{x2} = 2\sqrt{I_r I_s} J_2(\psi)\cos\theta \cos 2\omega t$ Eq. 26

Each of these terms are readily extractable from a multi-frequency lock-in. For example, if the lock-in X and Y channels are used (in phase and quadrature signals, which are proportional to sin $\omega t$ and cos $\omega t$, respectively), the AC components can be extracted as:

$I_{x1x} = -2\sqrt{I_r I_s} J_1(\psi)\sin\theta$ Eq. 27

$I_{x2y} = 2\sqrt{I_r I_s} J_2(\psi)\cos\theta$ Eq. 28

Where $I_{x1x}$ is the lock-in X component at frequency $\omega$ and $I_{x2y}$ is the lock-in Y channel at $2\omega$.

Similarly, the expressions for the signals at the quadrature detector 1006 can be written as:

$I_{y0} = \frac{1}{2}(I_r + I_s) + \sqrt{I_r I_s} J_0(\psi)\sin\theta$ Eq. 29

$I_{y1} = 2\sqrt{I_r I_s} J_1(\psi)\cos\theta \sin\omega t$ Eq. 30

$I_{y2} = 2\sqrt{I_r I_s} J_2(\psi)\sin\theta \cos 2\omega t$ Eq. 31

Where $I_{y0}$ is the DC term, $I_{y1}$ is the $\omega$ term and $I_{y2}$ is the $2\omega$ term. And the lock-in signal components for the quadrature detector:

$I_{y1x} = 2\sqrt{I_r I_s} J_1(\psi)\cos\theta$ Eq. 32

$I_{y2y} = 2\sqrt{I_r I_s} J_2(\psi)\sin\theta$ Eq. 33

For the goal of extracting from one or more of these lock-in signals the value of the photothermal modulation amplitude $\psi$ which is indicative of the IR absorption by the sample, this can be obtained in a number of ways. Assuming that the intensities $I_r$ and $I_s$ are known or measured, the only free parameters left are the photothermal modulation amplitude $\psi$ and the DC phase offset $\theta$. Thus at least two equations are needed to solve for these two values $\psi$ and $\theta$. Any suitable combination of Eqs. 24/29 (for DC components) and/or Eqs. 25/30 and 26/31 can in principle be used to calculate $\psi$ and $\theta$. Two specific examples are illustrated. For example it is possible to divide Eq. 27 by Eq. 32 to get:

$I_{x1x}/I_{y1x} = -\tan\theta$ Eq. 34

So Eq. 34 can be solved for the DC phase $\theta = \tan^{-1}(-I_{x1x}/I_{y1x})$ Eq. 35

(Note that two argument versions of the inverse tangent function like the so-call "atan 2" function can be applied and/or with phase unwrapping techniques to provide a continuous measurement of the DC phase angle $\theta$ without discontinuities.)

A similar formulation can be used using the $2\omega$ from Eqs. 28 and 33. The approach using the AC components of the detector signals can provide a good value of the DC phase angle $\theta$ when the AC amplitudes are sufficiently high to extract $\theta$ with high fidelity. But in the cases of a weak IR absorption, the AC amplitudes may be small and in that case, it can be desirable to extract the phase in an alternate way. It is also possible, for example to extract the phase from the DC values from Eqs. 24 and 29. Solving them for sin $\theta$ and cos $\theta$ respectively:

$$\sin\theta = \frac{I_{y0} - \frac{1}{2}(I_r + I_s)}{\sqrt{I_r I_s}\, J_0(\psi)}$$ Eq. 36

$$\cos\theta = \frac{I_{xo} - \frac{1}{2}(I_r + I_s)}{\sqrt{I_r I_s}\, J_0(\psi)}$$ Eq. 37

Eq. 36 can be divided by Eq. 37 to get tan $\theta$, which can then be inverted to get:

$\theta = \operatorname{atan} 2(I_{y0} - \frac{1}{2}(I_r + I_s), I_{xo} - \frac{1}{2}(I_r + I_s))$ Eq. 38

All of the terms in Eq. 38 can be readily measured, for example with a conventional data acquisition system or for example as auxiliary DC inputs on a lock-in amplifier. The atan 2 function is convenient as it provides a continuous output avoids a discontinuity in the inverse $\tan^{-1}$ function when cos $\theta=0$.

Figure 15:
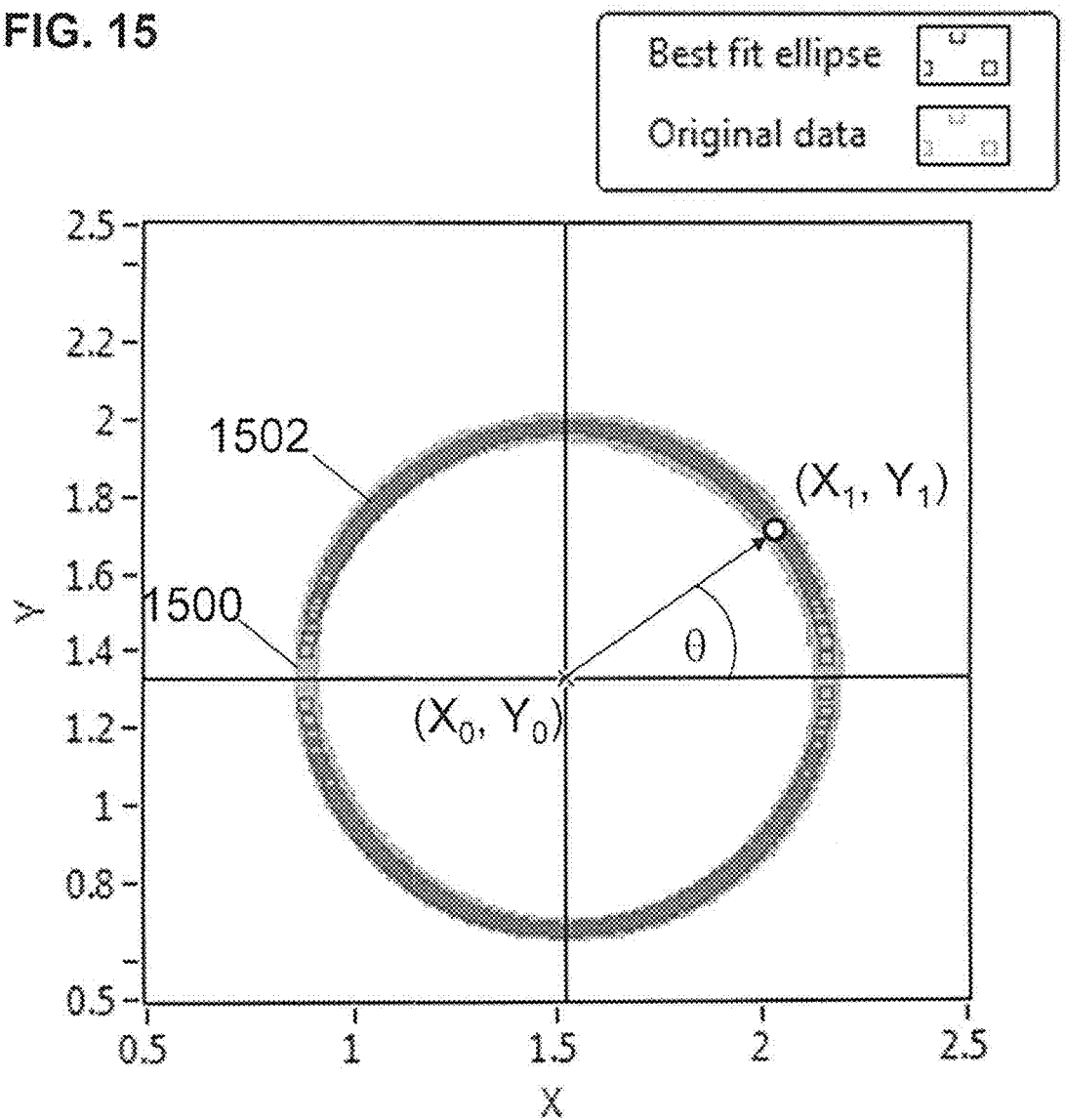
FIG. 15 shows a plot of one detector voltage against another in a Lissajous figure of an embodiment.

A slightly modified alterative way obtain the DC phase is to modulate the phase while simultaneously observing the DC signals on the two quadrature detectors. Plotting one detector voltage against the other will result in a Lissajous figure an example of which 1300 is shown in FIG. 15. A circle or more generally an ellipse 1302 can be fitted to the Lissajous FIG. 1300, where output parameters of the fit can include the X and Y center positions of the ellipse. These center positions can then be used subsequently to calculate the phase angle $\theta$ from any DC values of the quadrature detector signal levels. As an example, consider measurement of instantaneous detector values of $X_1$ and $Y_1$ where these are the signal levels on detectors 126 and 1006 respectively. The DC phase angle $\theta$ by first calculating:

$\Delta X = X_1 - X_0, \Delta Y = Y_1 - Y_0$ Eq. 39 and then $\theta = \operatorname{atan} 2(\Delta Y, \Delta X)$. Eq. 40

This approach is analogous to the one just above using Eq. 32-34, except that it allows for the possibility that the detector center values are not equal, i.e. $X_0 \neq Y_0$. It is also possible to include any number of corrections to account for the fact that the Lissajous figure may not be perfectly round, which are not described in detail herein because it is understood that these corrections will be readily understood to those of skill in the art of optical systems design.

A further alternative approach for measuring the DC phase $\theta$ is to add an additional modulation of the reference mirror position, as was described associated with FIG. 2 and is described in the application note "Interferometer Stabilization with Linear Phase Control Made Easy" by Zurich Instruments. In this case the phase angle can be extracted with high fidelity using lock-in detection independent of DC signal level drifts and independent of the amplitude of the photothermal modulation from IR absorption by the sample.

In any case, once the DC phase angle $\theta$ is known, then it is possible to calculate the photothermal modulation amplitude $\psi$. This can also be done in a number of ways, such as one specific example using Eq. 27 and/or Eq. 32, both reproduced below. As a reminder, these are the lock-in amplifier X signals for the components at frequency $\omega$ at the in phase and quadrature detectors 126 and 1006, respectively. The first thing to notice is that these two equations are very similar, except that one depends on $\sin \theta$ and the other on $\cos \theta$. Having both signals available is very advantageous as it will permit extraction of the signal $\psi$ even at phase angles where $\sin \theta$ or $\cos \theta$ are near zero.

$$I_{x1x} = -2\sqrt{I_r I_s} J_1(\psi) \sin \theta \qquad \text{Eq. 27:}$$

$$I_{y1x} = 2\sqrt{I_r I_s} J_1(\psi) \cos \theta \qquad \text{Eq. 32:}$$

Because the photothermal modulation amplitude is typically very small (≪1), it is possible to approximate the Bessel function $J_1(\psi)$ with a simple linear expansion: $J_1(\psi) \approx \psi/2$. Thus Eq. 27 and 32 can be rewritten as:

$$I_{x1x} = -\sqrt{I_r I_s} \psi \sin \theta \qquad \text{Eq. 41:}$$

$$I_{y1x} = \sqrt{I_r I_s} \psi \cos \theta \qquad \text{Eq. 42:}$$

Which in turn can be solved for the photothermal modulation signal $\psi$:

$$\psi_I = \frac{-I_{x1x}}{\sqrt{I_r I_s} \sin \theta} \qquad \text{Eq. 43}$$

$$\psi_Q = \frac{I_{y1x}}{\sqrt{I_r I_s} \cos \theta} \qquad \text{Eq. 44}$$

Where $\psi_I$ is the value of the photothermal modulation signal $\psi$ from the in phase detector and $\psi_Q$ is the value of $\psi$ from the quadrature detector. If one is unconcerned about absolute scale factors, these expressions can be simplified as:

$$\psi_{rI} = \frac{-I_{x1x}}{\sin \theta} \qquad \text{Eq. 45}$$

$$\psi_{rI} = \frac{I_{y1x}}{\cos \theta} \qquad \text{Eq. 46}$$

Where $\psi_{rI/Q}$ are the relative photothermal modulation signals independent of the scale factors from the reference and sample beam intensities.

Analogous calculations can be performed on the $2\omega$ signals in Eqs. 28 and 33. The net result of this derivation is the following: The use of a quadrature interferometer scheme allows the extraction of the photothermal modulation signal by the following steps:

(1) extracting the DC phase $\theta$;
(2) recording one or more of the lock-in signals for $\omega$ or $2\omega$ (or higher harmonics);
(3) Calculating the photothermal modulation amplitude $\psi$ from one or more of the lock-in signals.

Because Eqs. 43 and 44 have different sensitivities depending on the relative DC phase angle $\theta$, it can be advantageous to use one or the other or both, depending on the value of $\theta$. For example, when $\sin \theta \approx 0$, Eq. 43 will provide a very noisy result and Eq. 44 is preferred. And the converse is true when $\cos \theta \approx 0$. It is also possible to use both Eqs. 43 and 44 (or 45/46) simultaneously and create a weighted average based on the relative fidelity of the calculations. For example one can construct the weighted average:

$$\psi_{ave} = \psi_I \sin^2 \theta + \psi_Q \cos^2 \theta \qquad \text{Eq. 46:}$$

Eq. 46 provides a convenient means of continuously calculating the photothermal modulation amplitude no matter what the relative size of $\sin \theta$ and $\cos \theta$. This equation will automatically give more weight to the value of the specific lock-in signal $I_{x1x}$ and $I_{y1x}$ depending on the value of $\sin \theta$ and $\cos \theta$. For example, this form of the weighted average provides high weighting to the $\psi_I$ term when the $\sin \theta$ term is near $\pm 1$ and more weighting to the $\psi_Q$ term when $\cos \theta$ is near $\pm 1$. It is also conveniently normalized because $\sin^2 \theta + \cos^2 \theta = 1$.

Eq. 46 can also be rewritten as $$\psi_{ave} = \frac{-2 I_{x1x}}{\sqrt{I_r I_s}} \sin \theta + \frac{2 I_{y1x}}{\sqrt{I_r I_s}} \cos \theta \qquad \text{Eq. 47}$$

And without the scaling factors, the relative amplitude $\psi_{ave,r}$ can be written more simply as:

$$\psi_{ave,r} = -I_{x1x} \sin \theta + I_{y1x} \cos \theta \qquad \text{Eq. 48:}$$

The form of Eqs. 47 and 48 makes it clear that this function is continuous, bounded for all values of the DC phase $\theta$. The calculation is also deterministic (i.e. does not require any curve fitting or iterative calculation.) Equations 47 and 48 and the preceding equations for calculating the DC phase $\theta$ also provides a means to extract the signal indicative of IR absorption of the sample that is substantially independent of the DC phase of the interferometer. While a non-quadrature interferometer will have a sensitivity that varies dramatically with the DC phase of the interferometer, a quadrature interferometer used with the equations above provide a signal for all values of the DC phase with a consistent sensitivity that is independent of the DC phase of the interferometer. It is thus suitable for rapid automated calculation. In practice then, the measurement can proceed as follows:

1) Capture signals from in phase and quadrature detectors 126 and 1006, which can be done simultaneously in embodiments;
2) Extract the DC optical phase angle $\theta$ from at least one of DC and/or AC intensities of the in phase and quadrature detectors;
3) Demodulate signals from at least one of the detectors to extract at least one demodulated signal at the modulation frequency of the IR source or harmonic thereof;
4) Use at least one demodulated signal along with the extracted DC optical phase angle $\theta$ to calculate a photothermal modulation signal $\psi$ indicative of the IR absorption of the sample; and
   i) Record the photothermal modulation signal at a plurality of wavelengths to acquire infrared absorption spectra 144 of the sample; and/or
   ii) Record the photothermal modulation signal at a plurality of sample locations to acquire infrared absorption image 142 of the sample.

The computations described above can be performed by a digital signal processor (DSP), field programmable gate array (FPGA), graphics processing unit (GPU), microcontroller, personal computer, single board computer, smart phone, tablet or any other suitable computation device. Lock-in amplifiers with additional signal manipulation/computation capabilities can also be used.

Figure 16A:
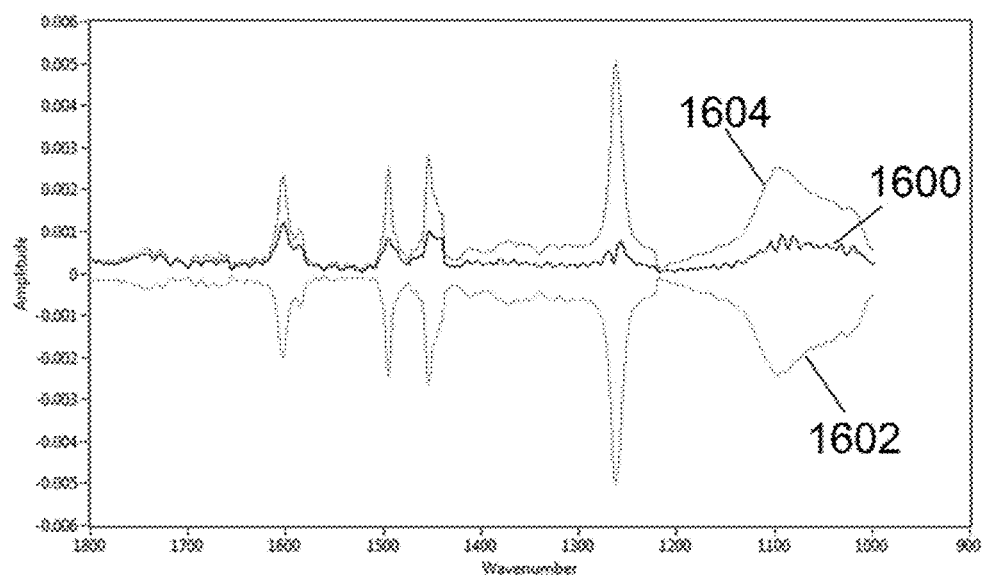
FIGS. 16A-16C show graphic examples of generating a photothermal IR absorption spectrum in accordance with various embodiments.
Figure 16B:
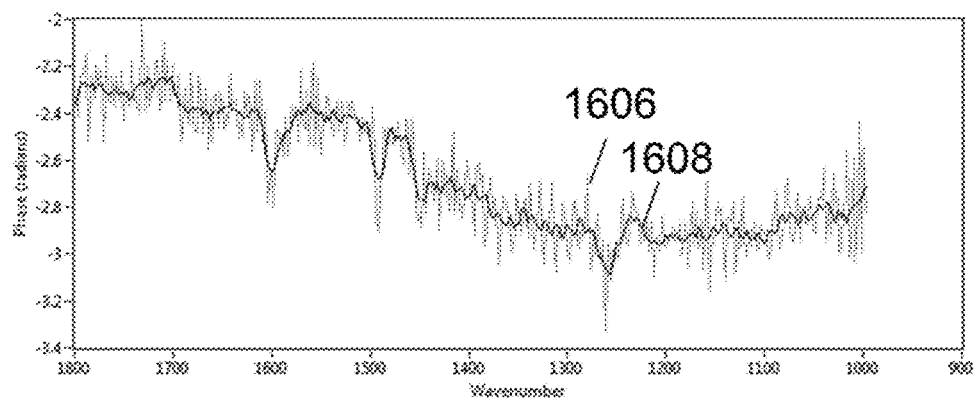
Figure 16C:
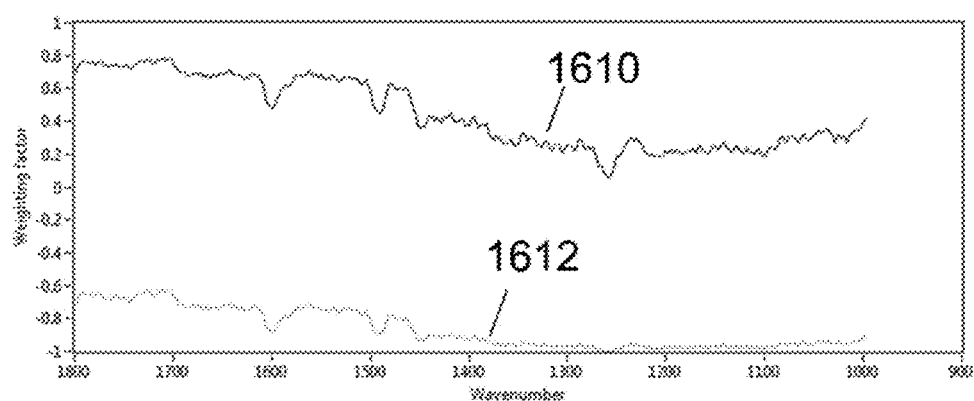

FIGS. 16A-16C shows examples of generating a photothermal IR absorption spectrum using quadrature interferometry as described above. FIG. 16A shows the lock-in X channel signals 1600 and 1602 for two detectors in quadrature as described associated with FIG. 10 detectors 126 and 1006. These are the two signals $I_{x1x}$ and $I_{y1x}$ from Eq. 46.

FIG. 16B also shows a final reconstructed spectrum $\psi_{ave,r}$ (1604) calculated using Eq. 46. FIG. 16B shows the calculation of the DC phase θ (1606) calculated using the DC values of the two quadrature detector signals as described in associated with FIG. 15 above. Signal 1608 is a smoothed version of the DC phase signal 1606, in this case using a Savitzky-Golay filter. FIG. 16C shows the relative weighting terms −sin θ (1610) and cos θ (1612) used to calculate the reconstructed spectrum $\psi_{ave,r}$ (1604) using Eq. 46.

Figure 17:
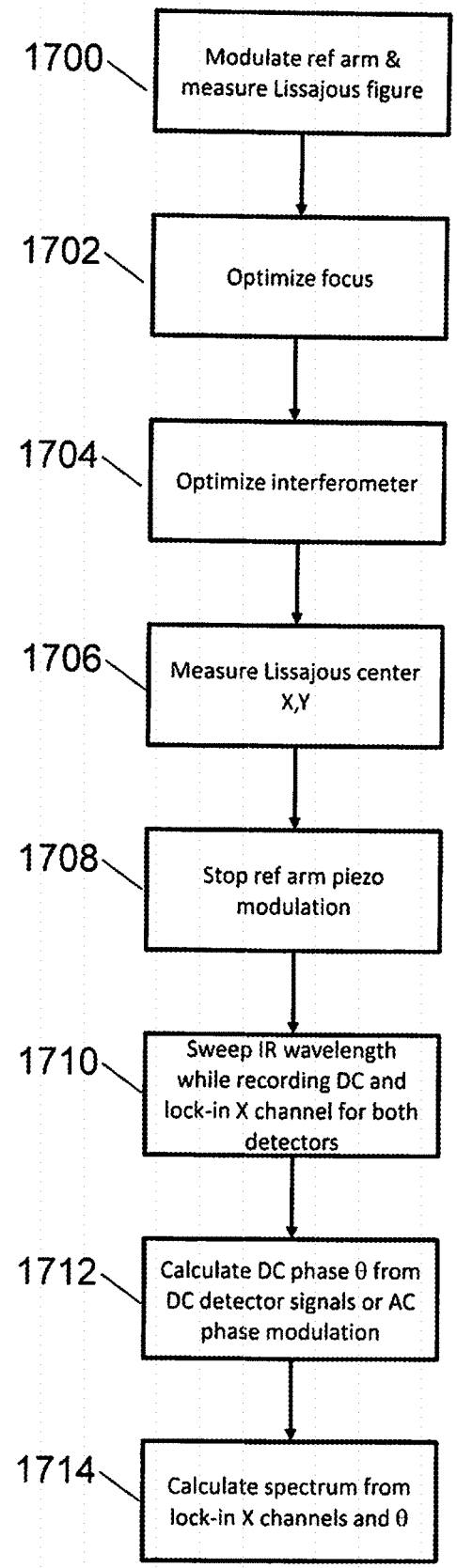
FIG. 17 depicts a method used to determine the spectrums shown in FIGS. 16A-C, While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

FIG. 17 summarizes a method used to acquire and calculate the spectrums in FIGS. 16A-C, using the apparatus described associated with FIG. 10. In step 1700 a modulation is applied to the reference arm of the interferometer to modulate the relative phase between the sample and reference arm. For the data in FIG. 16, this was accomplished using a piezoelectric actuator to dither the position of reference reflector 105 with a frequency in the range of 100-300 Hz. By recording the DC intensity of detectors 126 and 1006 in FIG. 10, it was possible to generate a Lissajous figure like 1500 in FIG. 15. Once a Lissajous figure is being created, it can be used to optimize adjustments of the instrument. For example in step 1702, the focus of the instrument can be adjusted, i.e. by adjusting the relative separation between the sample 112 and the objective 108 in FIG. 10. The focus can be optimized in one of several ways. First, it can be optimized by maximizing the sum of DC intensities captured by the detector. It can alternately be optimized by minimizing the size of focused spot 110 in FIG. 10. Alternately, it can be optimized by maximizing the modulation depth of the interferometer signal, i.e. the peak to peak amplitude of the modulation of signals from detectors 126 and/or 1006. It can also be readily optimized by maximizing the area enclosed within the Lissajous ellipse 1500 in FIG. 15. In step 1704, the interferometer may be optionally adjusted an optimized. For example the angles of reference reflector 105 in FIG. 10 can be adjusted to maximize the modulation depth of the interferometer as described above. This adjustment can be manual or automated. Using for example a piezo driven kinematic mirror mount, it is possible to provide both tip/tilt adjustment for step 1704 and the phase modulation described associated with step 1700. Not that steps 1702 and 1704 can be performed in either order and can be performed iteratively if desired. In step 1706 the center of the Lissajous figure is optionally measured for used in extracting the DC phase value θ. Or alternately, the DC phase may be determined using a continuous modulation scheme as described previously. If the DC detector signals will be used to calculate the DC phase, then in step 1708, the reference arm modulation may be stopped. If a continuous phase modulation scheme is used to extract the phase, for example the scheme described in the Zurich Instruments application note, then the phase modulation can be continued, though generally the modulation amplitude will be decreased. In step 1710, IR source 114 in FIG. 10 is swept over a plurality emission wavelengths (wavenumbers) while recording the lock-in X channel signals for detectors 126 and 1006. Optionally, the DC detector values can be simultaneously recorded. In step 1712 the DC phase is calculated, for example using one of several methods described above. If using the DC detector signals, the DC phase can be calculated using Eq. 37 or the formula θ=atan 2(ΔY, ΔX) as described associated with FIG. 15. Using continuous phase modulation the phase can be calculated using Eq. 5 in the Zurich Instruments application note. Then in step 1714 a final reconstructed spectrum $\psi_{ave,r}$ (1604 in FIG. 16) can be calculated using the lock-in X signals 1600 and 1602 using Eq. 46.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical elements, control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An apparatus for microscopic analysis of a sample that improves characterization of infrared absorption of the sample, the apparatus comprising:
   a source of infrared radiation configured to illuminate the sample with a beam of infrared radiation;
   a source of probe radiation configured to emit a beam of probe radiation;
   an asymmetric interferometer including:
      a beam splitter configured to divide the beam of probe radiation onto at least two paths, including:
         a first path that is directed towards the sample such that the beam of probe radiation on the first path at least partially overlaps the beam of infrared radiation, and
         a second path that is directed towards a reference reflector;
      a beam combiner configured to create an interference of probe radiation reflected from the sample along the first path with probe radiation reflected from the reference reflector along the second path, wherein a power of the probe radiation reflected along the second path is greater than a power of the probe radiation reflected along the first path; and
   a first detector configured to detect the interference of probe radiation for use in producing a signal indicative of infrared absorption of the sample.

2. The apparatus of claim 1 further comprising a phase feedback loop configured to measure and adjust a relative phase of the probe radiation along the first path versus the second path.

3. The apparatus of claim 2, wherein the phase feedback loop is configured to maintain a setpoint optical phase difference between the probe radiation reflected from the sample along the second path and the probe radiation reflected from the reference reflector along the first path.

4. The apparatus of claim 2 wherein the phase feedback loop comprises an actuator configured to add a modulation to the relative phase between the probe radiation along the first path and the second path, and a demodulator configured to determine a signal indicative of the relative phase in response to the modulation.

5. The apparatus of claim 2 wherein the phase feedback loop is configured to use a fringe tracking technique.

6. The apparatus of claim 5 wherein the fringe tracking techniques includes a beam sampler configured to sample a portion of the interference of probe radiation reflected from the sample along the first path with probe radiation reflected from the reference reflector along the second path and send the portion sent to the first detector which is configured to monitor a position of one or more interferometric fringes and produce a signal indicative of the relative optical phase between the first path and the second path in response to the position of the one or more interferometric fringes.

7. The apparatus of claim 2 further comprising a beam sampler and a second detector, wherein the second detector is configured to sample a portion of the interference of probe radiation reflected from the sample along the first path with probe radiation reflected from the reference reflector along the second path and provide a signal indicative of the relative phase of the probe radiation along the first path versus the second path.

8. The apparatus of claim 1 wherein the asymmetric interferometer is a quadrature interferometer.

9. The apparatus of claim 8 wherein the quadrature interferometer comprises at least one retarder, at least a second beam splitter, and at least one second detector, and wherein the second beam splitter is configured to divide the interference of probe radiation reflected from the sample along the first path with probe radiation reflected from the reference reflector along the second path between the first detector and the at least one second detector.

10. The apparatus of claim 9 wherein the quadrature interferometer is configured to provide an optical phase offset of substantially 90° between the first detector and the at least one second detector.

11. The apparatus of claim 8 wherein the apparatus provides a signal indicative of the infrared absorption of the sample, with a sensitivity that is independent of a relative optical phase difference between the first path and second path.

12. The apparatus of claim 1, wherein the beam splitter and the beam combiner comprise at least two separate optical elements configured as a Mach-Zehnder interferometer.

13. The apparatus of claim 1, wherein the beam splitter and the beam combiner both comprise a common beam splitting optical component.

14. The apparatus of claim 13, wherein the common beam splitting optical component reflects about 50% of incident light and transmits about 50% of incident light.

15. The apparatus of claim 1 wherein the detector comprises a plurality of detectors with a difference in optical phase between at least two of the detectors that are configured to reconstruct the signal indicative of infrared absorption of the sample at any phase.

16. The apparatus of claim 1, wherein the asymmetric interferometer provides at least a ten times amplification of the signal indicative of infrared absorption of the sample as compared to the signal indicative of infrared absorption with the second path blocked.

17. The apparatus of claim 1, wherein the asymmetric interferometer is selected from the group consisting of a Michelson interferometer, a Mach-Zehnder interferometer, and a common path interferometer.

18. The apparatus of claim 1 further comprising a phase modulator in at least one of the first path and the second path.

19. The apparatus of claim 18 wherein the source of infrared radiation is modulated at a frequency $f_m$ and the phase modulator is modulated at a frequency $f_p$ and wherein a signal from the detector is demodulated at a frequency $mf_m \pm nf_p$ where m and n are integers.

20. The apparatus of claim 1 wherein the beam of infrared radiation and the beam of probe radiation are incident on the sample from opposite sides of the sample.

21. The apparatus of claim 1 wherein the beam of infrared radiation and the beam of probe radiation are incident on the sample from the same side of the sample.

22. The apparatus of claim 1 wherein the sample is substantially opaque to infrared light.

23. The apparatus of claim 1 wherein the asymmetric interferometer comprises a common path interferometer and wherein the beam of probe radiation is focused on the first path to a region of interest on the sample and wherein the beam of probe radiation on the second path is directed to a reference reflector on the sample and adjacent to the region of interest.

24. The apparatus of claim 23 wherein the beam splitter and the beam combiner are a common beam splitter in an optical objective that focuses the beam of probe radiation onto the sample.

25. The apparatus of claim 24 wherein the optical objective is a Mirau objective.

26. The apparatus of claim 24 wherein the optical objective is a refractive objective.

27. The apparatus of claim 26, wherein the refractive objective comprises a mirror that reflects infrared light to the sample that is at least partially overlapped with the beam of probe radiation focused by the refractive objective onto the sample.

28. The apparatus of claim 27 wherein the refractive objective has a central obscuration area percentage of less than 10%.

29. The apparatus of claim 28 wherein refractive objective has a central obscuration area percentage of less than 1%.

30. The apparatus of claim 1 wherein a spatial resolution of the signal indicative of infrared absorption of the sample is <500 nm.

31. A method for microscopic analysis of a sample to provide improved characterization of infrared absorption of the sample, the method comprising:
  illuminating the sample with a beam of infrared radiation to create an infrared illuminated spot on the sample;
  providing a beam of probe radiation;
  dividing the beam of probe radiation at a beam splitter onto at least two paths, the two paths including:
    a first path that is directed towards the sample such that the beam of probe radiation on the first path at least partially overlaps the infrared illuminated spot on the sample, and
    a second path that is directed towards a reference reflector;
  recombining the probe radiation reflected from the sample along first path and the probe radiation reflected off the reference reflector along the second path to create an interference of probe radiation, wherein a power of the probe radiation reflected along the second path is greater than a power of the probe radiation reflected along the first path; and detecting the interference of probe radiation for use in producing a signal indicative of infrared absorption of the sample.

32. The method of claim 31, further comprising measuring and adjusting a relative phase of the probe radiation along the first path versus the second path.

33. The method of claim 31, wherein the method further comprises actively adjusting a length of the second path to maintain a setpoint optical phase difference between the probe radiation reflected from the sample along the second path and the probe radiation reflected from the reference reflector along the first path.

34. The method of claim 31, wherein the detecting interference step is performed with a quadrature interferometer.

35. The method of claim 31, wherein dividing the beam of probe radiation and recombining the probe radiation are both accomplished with a common beam splitting optical component.

36. The method of claim 35, wherein the beam splitting optical component reflects about 50% of incident light and transmits about 50% of incident light.

37. The method of claim 31, wherein recombining the probe radiation comprises using a plurality of detectors with a difference in optical phase between at least two of the plurality of detectors in reconstructing the signal indicative of infrared absorption of the sample at any phase.

38. The method of claim 31, wherein signal indicative of infrared absorption of the sample is at least ten times larger as compared to the signal indicative of infrared absorption with the second path blocked.

39. The method of claim 31, wherein the asymmetric interferometer is selected from the group consisting of a Michelson interferometer, a Mach-Zehnder interferometer, and a common path interferometer.

40. The method of claim 31 further comprising a phase modulator in at least one of the first path and the second path, and modulating the beam of infrared radiation at a frequency $f_m$ and modulating the phase modulator at a frequency $f_p$, wherein a signal from the detector is demodulated at a frequency $mf_m \pm nf_p$ where m and n are integers.

41. An apparatus for microscopic analysis of a sample that improves characterization of infrared absorption of the sample, the apparatus comprising:
a source of infrared radiation configured to illuminate the sample with a beam of infrared radiation;
a source of probe radiation configured to emit a beam of probe radiation;
a quadrature interferometer including:
a first beam splitter configured to divide the beam of probe radiation onto at least two paths, including:
a first path that is directed towards the sample such that the beam of probe radiation on the first path at least partially overlaps the beam of infrared radiation, and
a second path that is directed towards a reference reflector;
a beam combiner configured to combine probe radiation from the probe radiation reflected from the sample along the first path with probe radiation reflected from the reference reflector along the second path to create a combined probe radiation;
a second beam splitter configured to divide the combined probe radiation onto at least a third path and a fourth path;
at least two detectors configured to detect interference of probe radiation on at least one of the third path and the fourth path for use in producing a signal indicative of infrared absorption of the sample.

42. The apparatus of claim 41 wherein the interferometer is an asymmetric interferometer.

43. The apparatus of claim 41 wherein the interferometer is a common path interferometer.

44. The apparatus of claim 41 further comprising a polarizing sensitive optic along at least one of the third path and the fourth path to direct the probe radiation to at least two different detectors.

45. The apparatus of claim 41 wherein the apparatus provides a signal indicative of the infrared absorption of the sample with a sensitivity that is independent of a relative optical phase difference between the first path and second path.

46. A method for microscopic analysis of a sample to provide improved characterization of infrared absorption of the sample, the method comprising:
illuminating the sample with a beam of infrared radiation to create an infrared illuminated spot on the sample;
providing a beam of probe radiation;
dividing the beam of probe radiation at a beam splitter onto at least two paths, the two paths including:
a first path that is directed towards the sample such that the beam of probe radiation on the first path at least partially overlaps the infrared illuminated spot on the sample, and
a second path that is directed towards a reference reflector;
recombining the probe radiation reflected from the sample along the first path and the probe radiation reflected off the reference reflector along the second path to create a recombined probe radiation,
dividing the recombined probe radiation onto at least two detector paths to at least two detectors;
arranging a relative optical phase offset between the at least two detector paths; and
producing a signal indicative of infrared absorption of the sample using the recombined probe radiation from the at least two detectors.

47. The method of claim 46 further comprising modulating a relative optical path difference between the first path and second path.

48. The method of claim 46 further comprising generating a Lissajous figure plotting an intensity of the at least two detectors.

49. The method of claim 48 further comprising optimizing at least one of a sample focus and an interferometer alignment using the Lissajous figure.

50. The method of claim 46 further comprising modulating an intensity of the beam of infrared radiation at frequency ω, wherein an optical phase difference between the first path and the second path comprises a total optical phase difference $\phi$ characterized by a DC optical phase difference $\theta$ and an AC phase modulation $\psi$, wherein the total optical phase difference $\phi$ is characterized by a sum of the DC optical phase difference and the AC phase modulation.

51. The method of claim 50 further comprising measuring a signal indicative of DC optical phase difference $\theta$ and using the signal of DC optical phase difference $\theta$ to calculate a signal indicative of the AC phase modulation $\psi$, wherein $\psi$ is indicative of infrared absorption of the sample.

52. The method of claim 51 wherein the DC optical phase difference θ is determined by measuring DC intensities of interfering radiation at the at least two detectors.

53. The method of claim 45 wherein the DC optical phase difference θ is determined by demodulating AC signals from the at least two detectors.

54. The method of claim 50 further wherein the producing a signal indicative of infrared absorption of the sample step comprises demodulating a signal from at least one detector at a frequency nω where n is an integer.

55. The method of claim 50 wherein the AC phase modulation ψ is calculated from an equation proportional to $\psi = -I_{x1x} \sin\theta + I_{y1x} \cos\theta$, where $I_{x1x}$ is a lock-in signal from one detector demodulated at frequency nω and $I_{y1x}$ is a lock-in signal from another detector, where m and n are integers.

56. An apparatus for microscopic analysis of a sample that improves characterization of infrared absorption of the sample, the apparatus comprising:
- a source of infrared radiation configured to illuminate the sample with a beam of infrared radiation;
- a source of probe radiation configured to emit a beam of probe radiation;
- an interferometer including:
  - a beam splitter configured to divide the beam of probe radiation onto at least two paths, including:
    - a first path that is directed towards the sample such that the beam of probe radiation on the first path at least partially overlaps the beam of infrared radiation, and
    - a second path that is directed towards a reference reflector;
  - a beam combiner configured to create an interference of probe radiation reflected from the sample along the first path with probe radiation reflected from the reference reflector along the second path;
  - a first detector configured to detect the interference of probe radiation for use in producing a signal indicative of infrared absorption of the sample; and
  - a phase feedback loop configured to measure and adjust a relative phase of the probe radiation along the first path versus the second path.

* * * * *